(12) United States Patent
Elkovitch et al.

(10) Patent No.: US 7,309,727 B2
(45) Date of Patent: Dec. 18, 2007

(54) CONDUCTIVE THERMOPLASTIC COMPOSITIONS, METHODS OF MANUFACTURE AND ARTICLES DERIVED FROM SUCH COMPOSITIONS

(75) Inventors: Mark Elkovitch, Clifton Park, NY (US); Soumyadeb Ghosh, Bangalore (IN); Nitin Mutha, Karnataka (IN); Srinivasan Rajagopalan, Karnataka (IN); Sai-Pei Ting, Slingerlands, NY (US)

(73) Assignee: General Electric Company, Schenectady, NY (US)

( * ) Notice: Subject to any disclaimer, the term of this patent is extended or adjusted under 35 U.S.C. 154(b) by 198 days.

(21) Appl. No.: 10/674,096

(22) Filed: Sep. 29, 2003

(65) Prior Publication Data

US 2005/0070657 A1    Mar. 31, 2005

(51) Int. Cl.
*C08K 3/04* (2006.01)
*C08K 3/10* (2006.01)
*C08K 3/18* (2006.01)
*C08K 3/22* (2006.01)
*H01B 1/04* (2006.01)
*H01B 1/06* (2006.01)

(52) U.S. Cl. .................. 524/449; 524/431; 524/435; 524/439; 524/440

(58) Field of Classification Search ............... 524/495, 524/431, 435, 439, 440, 449
See application file for complete search history.

(56) References Cited

U.S. PATENT DOCUMENTS

| | | | |
|---|---|---|---|
| 2,465,319 A | 3/1949 | Whinfield et al. | |
| 3,047,539 A | 7/1962 | Pengilly | |
| 3,324,068 A | 6/1967 | Michaels | |
| 3,847,867 A | 11/1974 | Heath et al. | |
| 3,850,885 A | 11/1974 | Takekoshi et al. | |
| 3,852,113 A | 12/1974 | Yokota et al. | |
| 3,852,242 A | 12/1974 | White | |
| 3,855,178 A | 12/1974 | White et al. | |
| 3,972,902 A | 8/1976 | Heath et al. | |
| 3,983,093 A | 9/1976 | Williams, III et al. | |
| 4,005,053 A | 1/1977 | Briggs et al. | |
| 4,115,475 A | 9/1978 | Foy et al. | |
| 4,141,927 A | 2/1979 | White et al. | |
| 4,195,015 A | 3/1980 | Deleens et al. | |
| 4,230,838 A | 10/1980 | Foy et al. | |
| 4,331,786 A | 5/1982 | Foy et al. | |
| 4,332,920 A | 6/1982 | Foy et al. | |
| 4,443,591 A | 4/1984 | Schmidt et al. | |
| 4,455,410 A | 6/1984 | Giles, Jr. et al. | |
| 4,492,382 A | 1/1985 | Hounsel | |
| 4,536,531 A | 8/1985 | Ogawa et al. | |
| 4,559,164 A | 12/1985 | Kostelnik et al. | |
| 4,565,684 A | 1/1986 | Tibbetts et al. | |
| 4,572,813 A | 2/1986 | Arakawa | |
| 4,637,945 A | 1/1987 | Masui et al. | |
| 4,663,230 A | 5/1987 | Tennent | |
| 4,680,329 A | 7/1987 | Brown et al. | |
| 4,749,451 A | 6/1988 | Naarmann | |
| 4,816,289 A | 3/1989 | Komatsu et al. | |
| 4,839,441 A | 6/1989 | Cuzin et al. | |
| 4,864,014 A | 9/1989 | Cuzin et al. | |
| 4,871,613 A | 10/1989 | Akao | |
| 4,876,033 A | 10/1989 | Dziurla et al. | |
| 4,876,078 A | 10/1989 | Arakawa et al. | |
| 4,908,418 A | 3/1990 | Holub | |
| 4,908,419 A | 3/1990 | Holub et al. | |
| 4,966,729 A | 10/1990 | Carmona et al. | |
| 4,968,418 A | 11/1990 | Rohr | |
| 5,004,561 A | 4/1991 | Nomura et al. | |
| 5,024,818 A | 6/1991 | Tibbetts et al. | |
| 5,036,580 A | 8/1991 | Fox et al. | |
| 5,071,329 A | 12/1991 | Sano et al. | |
| 5,093,435 A | 3/1992 | Harris et al. | |
| 5,159,053 A | 10/1992 | Kolycheck et al. | |
| 5,165,909 A | 11/1992 | Tennent et al. | |
| 5,171,761 A | 12/1992 | Penco et al. | |
| 5,227,038 A | 7/1993 | Smalley et al. | |
| 5,256,335 A | 10/1993 | Byrd et al. | |
| 5,284,093 A | 2/1994 | Guaraldi et al. | |
| 5,284,903 A | 2/1994 | Minnick | |
| 5,300,203 A | 4/1994 | Smalley | |
| 5,300,553 A | 4/1994 | Yamanashi et al. | |
| 5,302,274 A | 4/1994 | Tomantschger et al. | |
| 5,312,866 A | 5/1994 | Tsutsumi et al. | |
| 5,354,607 A | 10/1994 | Swift et al. | |
| 5,385,970 A | 1/1995 | Gallucci et al. | |
| 5,439,987 A | 8/1995 | Scott et al. | |
| 5,445,327 A | 8/1995 | Creehan | |
| 5,484,837 A | 1/1996 | Kung et al. | |

(Continued)

FOREIGN PATENT DOCUMENTS

EP    0 198 558 B1    4/1993

(Continued)

OTHER PUBLICATIONS

U.S. Appl. No. 10/912,919.*

(Continued)

*Primary Examiner*—Kriellion A Sanders
(74) *Attorney, Agent, or Firm*—Cantor Colburn LLP

(57) ABSTRACT

Disclosed herein is an electrically conductive precursor composition comprising an organic polymer precursor; a single wall nanotube composition, wherein the single wall nanotube composition contains at least 0.1 wt % of production related impurities; and an optional nanosized conductive filler. A conductive composition comprises an organic polymer; a single wall nanotube composition, wherein the single wall nanotube composition contains at least 0.1 wt % of production related impurities; and a nanosized conductive filler.

23 Claims, 2 Drawing Sheets

U.S. PATENT DOCUMENTS

| | | | |
|---|---|---|---|
| 5,514,748 A | 5/1996 | Isutsumi et al. |
| 5,516,837 A | 5/1996 | Tsutsumi et al. |
| 5,543,474 A | 8/1996 | Kawaki et al. |
| 5,556,517 A | 9/1996 | Smalley |
| 5,566,892 A | 10/1996 | Creehan |
| 5,571,875 A | 11/1996 | Tsutsumi et al. |
| 5,589,152 A | 12/1996 | Tennent et al. |
| 5,591,312 A | 1/1997 | Smalley |
| 5,591,382 A | 1/1997 | Nahass et al. |
| 5,591,832 A | 1/1997 | Koshijima et al. |
| 5,604,284 A | 2/1997 | Ueda et al. |
| 5,641,455 A | 6/1997 | Rosenlund et al. |
| 5,643,502 A | 7/1997 | Nahass et al. |
| 5,643,990 A | 7/1997 | Uehara et al. |
| 5,651,922 A | 7/1997 | Nahass et al. |
| 5,652,326 A | 7/1997 | Ueda et al. |
| 5,654,357 A | 8/1997 | Menashi et al. |
| 5,718,995 A | 2/1998 | Eichorst et al. |
| 5,744,235 A | 4/1998 | Creehan |
| 5,830,326 A | 11/1998 | Iijima |
| 5,840,807 A | 11/1998 | Frey et al. |
| 5,863,466 A | 1/1999 | Mor |
| 5,866,647 A | 2/1999 | Massey et al. |
| 5,872,177 A | 2/1999 | Whitehouse |
| 5,876,647 A | 3/1999 | Makise et al. |
| 5,886,098 A | 3/1999 | Ueda et al. |
| 5,919,429 A | 7/1999 | Tanaka et al. |
| 6,063,874 A | 5/2000 | Jin et al. |
| 6,103,413 A | 8/2000 | Hinton et al. |
| 6,107,415 A | 8/2000 | Silvi et al. |
| 6,111,031 A | 8/2000 | Puyenbroek et al. |
| 6,148,280 A | 11/2000 | Kramer |
| 6,149,840 A | 11/2000 | Ardakani et al. |
| 6,149,848 A | 11/2000 | Makise et al. |
| 6,150,473 A | 11/2000 | Brown et al. |
| 6,156,256 A | 12/2000 | Kennel |
| 6,183,714 B1 | 2/2001 | Smalley et al. |
| 6,187,823 B1 | 2/2001 | Haddon et al. |
| 6,248,262 B1 | 6/2001 | Kubotera et al. |
| 6,252,011 B1 | 6/2001 | Scott |
| 6,265,466 B1 | 7/2001 | Glatkowski et al. |
| 6,277,952 B1 | 8/2001 | Dhawan et al. |
| 6,284,832 B1 | 9/2001 | Foulger et al. |
| 6,299,812 B1 | 10/2001 | Newman et al. |
| 6,331,265 B1 | 12/2001 | Dupire et al. |
| 6,344,513 B1 | 2/2002 | Numata |
| 6,346,189 B1 | 2/2002 | Dai et al. |
| 6,365,069 B2 | 4/2002 | Butler et al. |
| 6,368,569 B1 | 4/2002 | Haddon et al. |
| 6,372,376 B1 | 4/2002 | Fronk et al. |
| 6,376,057 B1 | 4/2002 | Akao et al. |
| 6,379,795 B1 | 4/2002 | Bisaria et al. |
| 6,384,128 B1 | 5/2002 | Wadahara et al. |
| 6,388,046 B1 | 5/2002 | Campbell et al. |
| 6,407,922 B1 | 6/2002 | Eckblad et al. |
| 6,426,134 B1 | 7/2002 | Lavin et al. |
| 6,517,995 B1 | 2/2003 | Jacobson et al. |
| 6,528,572 B1 | 3/2003 | Patel et al. |
| 6,540,945 B2 | 4/2003 | Kubotera et al. |
| 6,544,463 B1 | 4/2003 | Luzzi et al. |
| 6,555,945 B1 | 4/2003 | Baughman et al. |
| 6,565,784 B1 | 5/2003 | Esseghir et al. |
| 6,576,341 B1 | 6/2003 | Davey et al. |
| 6,599,446 B1 | 7/2003 | Todt et al. |
| 6,608,133 B2 | 8/2003 | Kurasawa et al. |
| 6,630,772 B1 | 10/2003 | Bower et al. |
| 6,634,321 B2 | 10/2003 | Hussain et al. |
| 6,643,165 B2 | 11/2003 | Segal et al. |
| 6,673,864 B2 | 1/2004 | Patel et al. |
| 6,689,835 B2 | 2/2004 | Amarasekera et al. |
| 6,734,262 B2 | 5/2004 | Patel |
| 6,761,870 B1 | 7/2004 | Smalley et al. |
| 6,790,425 B1 | 9/2004 | Smalley et al. |
| 6,811,724 B2 | 11/2004 | Majumdar et al. |
| 6,936,233 B2 * | 8/2005 | Smalley et al. ......... 423/447.1 |
| 2001/0010809 A1 | 8/2001 | Haddon et al. |
| 2001/0016608 A1 | 8/2001 | Haddon et al. |
| 2001/0023937 A1 | 9/2001 | Patel |
| 2001/0031900 A1 | 10/2001 | Margrave et al. |
| 2001/0041160 A1 | 11/2001 | Margrave et al. |
| 2002/0004028 A1 | 1/2002 | Margrave et al. |
| 2002/0031465 A1 | 3/2002 | Saito |
| 2002/0035170 A1 | 3/2002 | Glatkowski et al. |
| 2002/0039675 A1 | 4/2002 | Braun et al. |
| 2002/0046872 A1 | 4/2002 | Smalley et al. |
| 2002/0048632 A1 | 4/2002 | Smalley et al. |
| 2002/0053257 A1 | 5/2002 | Brice et al. |
| 2002/0068170 A1 | 6/2002 | Smalley et al. |
| 2002/0084410 A1 | 7/2002 | Colbert et al. |
| 2002/0085968 A1 | 7/2002 | Smalley et al. |
| 2002/0086124 A1 | 7/2002 | Margrave et al. |
| 2002/0088938 A1 | 7/2002 | Colbert et al. |
| 2002/0090331 A1 | 7/2002 | Smalley et al. |
| 2002/0091619 A1 | 7/2002 | Yang |
| 2002/0092613 A1 | 7/2002 | Kuper |
| 2002/0092983 A1 | 7/2002 | Colbert et al. |
| 2002/0092984 A1 | 7/2002 | Colbert et al. |
| 2002/0094311 A1 | 7/2002 | Smalley et al. |
| 2002/0096634 A1 | 7/2002 | Colbert et al. |
| 2002/0098135 A1 | 7/2002 | Smalley et al. |
| 2002/0099128 A1 | 7/2002 | Patel et al. |
| 2002/0102193 A1 | 8/2002 | Smalley et al. |
| 2002/0102194 A1 | 8/2002 | Smalley et al. |
| 2002/0102196 A1 | 8/2002 | Smalley et al. |
| 2002/0102201 A1 | 8/2002 | Colbert et al. |
| 2002/0102203 A1 | 8/2002 | Smalley et al. |
| 2002/0109086 A1 | 8/2002 | Colbert et al. |
| 2002/0109087 A1 | 8/2002 | Colbert et al. |
| 2002/0110513 A1 | 8/2002 | Margrave et al. |
| 2002/0127162 A1 | 9/2002 | Smalley et al. |
| 2002/0127169 A1 | 9/2002 | Smalley et al. |
| 2002/0127171 A1 * | 9/2002 | Smalley et al. ......... 423/447.1 |
| 2002/0136681 A1 | 9/2002 | Smalley et al. |
| 2002/0136683 A1 | 9/2002 | Smalley et al. |
| 2002/0150524 A1 | 10/2002 | Smalley et al. |
| 2002/0155333 A1 | 10/2002 | Fitts et al. |
| 2002/0159943 A1 | 10/2002 | Smalley et al. |
| 2002/0159944 A1 | 10/2002 | Smalley et al. |
| 2002/0161101 A1 | 10/2002 | Carroll et al. |
| 2002/0172789 A1 | 11/2002 | Watson et al. |
| 2002/0176650 A1 | 11/2002 | Zhao et al. |
| 2002/0179564 A1 | 12/2002 | Geobegan et al. |
| 2002/0180077 A1 | 12/2002 | Glatkowski et al. |
| 2002/0183438 A1 * | 12/2002 | Amarasekera et al. ...... 524/495 |
| 2002/0185770 A1 | 12/2002 | McKague |
| 2003/0001141 A1 | 1/2003 | Sun et al. |
| 2003/0004058 A1 | 1/2003 | Li et al. |
| 2003/0008123 A1 | 1/2003 | Glatkowski et al. |
| 2003/0010910 A1 | 1/2003 | Colbert et al. |
| 2003/0012722 A1 | 1/2003 | Liu |
| 2003/0026754 A1 | 2/2003 | Clarke et al. |
| 2003/0038279 A1 | 2/2003 | Ishioka et al. |
| 2003/0044608 A1 | 3/2003 | Yoshizawa et al. |
| 2003/0053801 A1 | 3/2003 | Cornell |
| 2003/0066960 A1 | 4/2003 | Colbert et al. |
| 2003/0075682 A1 | 4/2003 | Colbert et al. |
| 2003/0083421 A1 | 5/2003 | Kumar et al. |
| 2003/0089890 A1 | 5/2003 | Niu et al. |
| 2003/0089893 A1 | 5/2003 | Niu et al. |
| 2003/0092824 A1 | 5/2003 | Bastiaens et al. |
| 2003/0100653 A1 | 5/2003 | Chacko |
| 2003/0106998 A1 | 6/2003 | Colbert et al. |
| 2003/0108477 A1 | 6/2003 | Keller et al. |
| 2003/0111333 A1 | 6/2003 | Montgomery et al. |

| | | | |
|---|---|---|---|
| 2003/0122111 A1 | 7/2003 | Glatkowski et al. | |
| 2003/0124717 A1 | 7/2003 | Awano et al. | |
| 2003/0132376 A1 | 7/2003 | Bonnell et al. | |
| 2003/0133865 A1 | 7/2003 | Smalley et al. | |
| 2003/0143350 A1 | 7/2003 | Jimenez | |
| 2003/0151030 A1 | 8/2003 | Gurin | |
| 2003/0153965 A1 | 8/2003 | Supronowicz et al. | |
| 2003/0164427 A1 | 9/2003 | Glatkowski et al. | |
| 2003/0165658 A1 | 9/2003 | Hayakawa et al. | |
| 2003/0168756 A1 | 9/2003 | Balkus, Jr. et al. | |
| 2003/0170166 A1 | 9/2003 | Smalley et al. | |
| 2003/0171457 A1 | 9/2003 | Matuana et al. | |
| 2003/0180526 A1 | 9/2003 | Winey et al. | |
| 2003/0181568 A1 | 9/2003 | Amarasekera et al. | |
| 2003/0213939 A1* | 11/2003 | Narayan et al. | 252/500 |
| 2003/0216502 A1 | 11/2003 | McElrath et al. | |
| 2004/0009346 A1 | 1/2004 | Jang et al. | |
| 2004/0021133 A1 | 2/2004 | Nagpal et al. | |
| 2004/0028859 A1 | 2/2004 | LeGrande et al. | |
| 2004/0106998 A1 | 6/2004 | Ferree | |
| 2004/0186220 A1 | 9/2004 | Smalley et al. | |
| 2004/0211942 A1 | 10/2004 | Clark et al. | |
| 2004/0232389 A1 | 11/2004 | Elkovitch | |
| 2004/0238793 A1 | 12/2004 | Hossan et al. | |
| 2004/0262581 A1 | 12/2004 | Rodrigues | |
| 2005/0070657 A1 | 3/2005 | Elkovitch et al. | |

FOREIGN PATENT DOCUMENTS

| | | |
|---|---|---|
| EP | 0 822 224 A2 | 2/1998 |
| EP | 0 365 168 B1 | 5/1999 |
| EP | 1 073 090 A2 | 1/2001 |
| EP | 0 854 839 B1 | 4/2002 |
| EP | 1 209 123 A2 | 5/2002 |
| EP | 1 336 673 A1 | 8/2003 |
| EP | 1 359 169 A2 | 11/2003 |
| EP | 1 369 452 A1 | 12/2003 |
| EP | 1 052 654 B1 | 1/2004 |
| EP | 1 460 703 A1 | 9/2004 |
| WO | WO 97/09272 | 3/1997 |
| WO | WO 97/15935 | 5/1997 |
| WO | WO 97/32646 | 9/1997 |
| WO | WO 98/05920 | 2/1998 |
| WO | WO 98/39250 | 9/1998 |
| WO | WO 00/17101 | 3/2000 |
| WO | WO 00/17102 | 3/2000 |
| WO | WO 00/26138 | 5/2000 |
| WO | WO 00/52710 | 9/2000 |
| WO | WO 01/17101 A1 | 3/2001 |
| WO | WO 01/30694 A1 | 5/2001 |
| WO | WO 01/38219 A1 | 5/2001 |
| WO | WO 01/49599 A2 | 7/2001 |
| WO | WO 01/57284 A1 | 8/2001 |
| WO | WO 01/75902 A1 | 10/2001 |
| WO | WO 01/89013 A2 | 11/2001 |
| WO | WO 01/92381 A1 | 12/2001 |
| WO | WO 01/95344 A1 | 12/2001 |
| WO | WO 01/99146 A2 | 12/2001 |
| WO | WO 02/16257 A2 | 2/2002 |
| WO | WO 02/20402 A1 | 3/2002 |
| WO | WO 02/39051 A2 | 5/2002 |
| WO | WO 02/42204 A2 | 5/2002 |
| WO | WO 02/44566 A1 | 6/2002 |
| WO | WO 02/055769 A1 | 7/2002 |
| WO | WO 02/060812 A2 | 8/2002 |
| WO | WO 02/060813 A2 | 8/2002 |
| WO | WO 02/064868 A1 | 8/2002 |
| WO | WO 02/064869 A1 | 8/2002 |
| WO | WO 02/068170 A1 | 9/2002 |
| WO | WO 02/076430 A1 | 10/2002 |
| WO | WO 02/076724 A1 | 10/2002 |
| WO | WO 02/076888 A1 | 10/2002 |
| WO | WO 02/076903 A2 | 10/2002 |
| WO | WO 02/079082 A2 | 10/2002 |
| WO | WO 02/080195 A1 | 10/2002 |
| WO | WO 02/081372 A2 | 10/2002 |
| WO | WO 02/088025 A1 | 11/2002 |
| WO | WO 02/090330 A1 | 11/2002 |
| WO | WO 02/095097 A1 | 11/2002 |
| WO | WO 02/100154 A2 | 12/2002 |
| WO | WO 02/100775 A2 | 12/2002 |
| WO | WO 02/100931 A1 | 12/2002 |
| WO | WO 03/005450 A2 | 1/2003 |
| WO | WO 03/007314 A1 | 1/2003 |
| WO | WO 03/044741 A1 | 1/2003 |
| WO | WO 03/011755 A1 | 2/2003 |
| WO | WO 03/012722 A1 | 2/2003 |
| WO | WO 03/013199 A2 | 2/2003 |
| WO | WO 03/020638 A1 | 3/2003 |
| WO | WO 03/024798 A1 | 3/2003 |
| WO | WO 03/040026 A2 | 5/2003 |
| WO | WO 03/049219 A1 | 6/2003 |
| WO | WO 03/070821 A2 | 8/2003 |
| WO | WO 03/072679 A1 | 9/2003 |
| WO | WO 03/076703 A1 | 9/2003 |
| WO | WO 03/078315 A2 | 9/2003 |
| WO | WO 03/078317 A1 | 9/2003 |
| WO | WO 03/080513 A2 | 10/2003 |
| WO | WO 03/085049 A1 | 10/2003 |
| WO | WO 03/085681 A1 | 10/2003 |
| WO | WO 03/092763 A1 | 11/2003 |
| WO | WO 2004/001107 A2 | 12/2003 |
| WO | EP 1 428 793 A1 | 6/2004 |
| WO | WO 2004/059663 A1 | 7/2004 |
| WO | WO 2004/097852 A1 | 11/2004 |

OTHER PUBLICATIONS

Japanese Patent Office and Derwent Abstract for JP 2002365427 A2 Publication date Dec. 18, 2002.

Harry J. Barraza et al. "SWNT-Filled Thermoplastic and Elastomeric Composites Prepared by Miniemulsion Polymerization" NANO Letters, Aug. 2002, vol. 2, No. 8, pp. 797-802.

Cheol Park et al. "Dispersion of single wall carbon nanotubes by in situ polymerization under sonication" Chemical Physics Letters 364 (2002) pp. 303-308, Oct. 4, 2002.

International Search Report PCT/US2004/020082 International Filing Date Jun. 22, 2004.

International Search Report PCT/US 2004/026136 International Filing Date Aug. 8, 2004.

International Search Report PCT/US 2004/012109 International Filing Date Apr. 20, 2004.

International Search Report PCT/US 2004/025651 International Filing Date Aug. 6, 2004.

International Search Report PCT/US 2004/030864 International Filing Date Sep. 21, 2004.

International Search Report PCT/US 2004/031061 International Filing Date Sep. 22, 2004.

U.S. Appl. No. 11/057,946, filed Feb. 15, 2005, Keulen et al., Electrically Conductive Compositions and Method of Manufacture Thereof (Copy enclosed).

Japanese Abstract for JP 02-077442 Publication date Mar. 16, 1990.

Cotton and Wilkinson, *Advanced Inorganic Chemistry*, Publisher: John Wiley & Sons 6th edition, Publication date Mar. 1999, p. 76.

J.G. Smith, et al. "Carbon Nanotube/Space Durable Polymer Nanocomposite Films for Electrostatic Charge Dissipation" NASA Langley Research Center; 34th International SAMPE Technical Conference, Baltimore, Maryland, Nov. 4-7, 2002.

International Search Report PCT/US 2004/012146 International Filing Date Apr. 20, 2004.

U.S. Appl. No. 10/675,108, filed Sep. 30, 2003, Ghosh et al., Electrically Conductive Compositions, Methods of Manufacture Thereof and Articles Derived From Such Compositions (available in IFW).

U.S. Appl. No. 10/803,694, filed Mar. 18, 2004, Charati et al., Electrically Conductive Compositions and Method of Manufacture Thereof (available in IFW).

U.S. Appl. No. 10/608,976, filed Jun. 27, 2003, Rodrigues, Electrically Conductive Compositions and Method of Manufacture Thereof (available in IFW).

U.S. Appl. No. 09/787,473, filed Mar. 16, 2001 Jonh Margrave Chemical Derivatization of Single-Wall Carbon Nanotubes to Facilitate Solvation Thereof, and use of Derivatized Nanotubes (available in IFW).

U.S. Appl. No. 10/912,919, filed Aug. 6, 2004, Clark et al., Electrically Conductive Compositions and Method of Manufacture Thereof (Copy enclosed).

Japanese Abstract for JP 2002273741 A Publication date Sep. 25, 2002.

Japanese Abstract for JP 2003096313 A Publication date Apr. 3, 2003.

Japanese Abstract for JP 2001011344 A Publication date Jan. 16, 2001.

Japanese Abstract for JP 2002313147 A Publication date Oct. 25, 2002.

Japanese Abstract for JP 2003146632 A Publication date May 21, 2003.

"Conductive Plastics for Medical Applications" *Medical Device and Diagnostic Industry Magazine*, Jan. 1999 http://www.devicelink.com/mddl/archive/99/01/009.html.

Bernie Miller "Tiny Graphite 'tubes' Create High-Efficiency Conductive Plastics" *Conductive Plastics*, Plastics World Magazine article http://www.fibrils.com/conplas1.htm Jan. 18, 2001.

Hyperion Catalysis International "Unique Slough Resistant SR$^{tm}$ Series ESD Thermoplastic Product Line Offers Reduced Particle Contamination for Demanding Electronic Applications" http://www.fibrils.com/esd.htm Jan. 18, 2001.

M.S.P. Shaffer et al. "Dispersion And Packing Carbon Nanotubes"; Carbon vol. 36, No. 11, pp. 1603-1612; 1998; © 1998 Elsevier Science Ltd; Received Dec. 5, 1997; accepted in revised for Mar. 4, 1998.

Collins et al. "Controlling the Electronic Properties of Carbon Nanotube Bundles"; IBM Research Division, T.J. Watson Research Center, Yorktown Heights, NY 10598, USA; 1 Page; Abstract only; Jun. 6, 2002; http://www.nanotube.org/abstracts/collinsp.html.

Tesner et al. "Formation of Carbon Fibers from Acetylene" Carbon, 1970, vol. 8, pp. 435-442, Pergamon Pres. Great Britain; Received Sep. 8, 1969.

A. Dufresne et al. "Processing and Characterization of Carbon Nanotube/Poly(styrene0co-butyl acrylate) nanocomposites" Journal Of Materials Science 37 (2002); pp. 3915-3923; Received Aug. 21, 2001 and accepted Apr. 11, 2002.

International Search Report; International App. No. PCT/US2006/004468; Applicant's No. 08CN8788 (GP2-0388) Date of Mailing Nov. 20, 2006.

\* cited by examiner

CONDUCTIVE THERMOPLASTIC COMPOSITIONS, METHODS OF MANUFACTURE AND ARTICLES DERIVED FROM SUCH COMPOSITIONS

BACKGROUND

This disclosure relates to electrically conductive compositions and methods of manufacture thereof.

Articles made from organic polymers are commonly utilized in material-handling and electronic devices such as packaging film, chip carriers, computers, printers and photocopier components where electrostatic dissipation or electromagnetic shielding are important requirements. Electrostatic dissipation (hereinafter ESD) is defined as the transfer of electrostatic charge between bodies at different potentials by direct contact or by an induced electrostatic field. Electromagnetic shielding (hereinafter EM shielding) effectiveness is defined as the ratio (in decibels) of the proportion of an electromagnetic field incident upon the shield that is transmitted through it. As electronic devices become smaller and faster, their sensitivity to electrostatic charges is increased and hence it is generally desirable to utilize organic polymers that have been modified to provide improved electrostatically dissipative properties. In a similar manner, it is desirable to modify organic polymers so that they can provide improved electromagnetic shielding while simultaneously retaining some or all of the advantageous mechanical properties of the organic polymers.

Conductive fillers such as graphite fibers derived from pitch and polyacrylonitrile having diameters larger than 2 micrometers are often incorporated into organic polymers to improve the electrical properties and achieve ESD and EM shielding. However, because of the large size of these graphite fibers, the incorporation of such fibers generally causes a decrease in the mechanical properties such as impact. There accordingly remains a need in the art for conductive polymeric compositions, which while providing adequate ESD and EM shielding, can retain their mechanical properties.

BRIEF DESCRIPTION OF THE INVENTION

Disclosed herein is an electrically conductive precursor composition comprising an organic polymer precursor; a single wall nanotube composition, wherein the single wall nanotube composition contains at least 0.1 wt % of production related impurities; and an optional nanosized conductive filler.

Disclosed herein too is a conductive composition comprising an organic polymer; a single wall nanotube composition, wherein the single wall nanotube composition contains at least 0.1 wt % of production related impurities; and a nanosized conductive filler.

Disclosed herein too is a method for manufacturing a conductive composition comprises blending an organic polymer, a single wall carbon nanotube composition, wherein the single wall nanotube composition contains at least 0.1 wt % of production related impurities; and a nanosized conductive filler in a manner effective to render to the composition an electrical volume resistivity less than or equal to about $10e^8$ ohm-cm, and a notched Izod impact strength of greater than or equal to about 5 kilojoules/square meter.

Disclosed herein too are articles manufactured from the aforementioned compositions and methods.

DETAILED DESCRIPTION OF PREFERRED EMBODIMENTS

Figure 1:
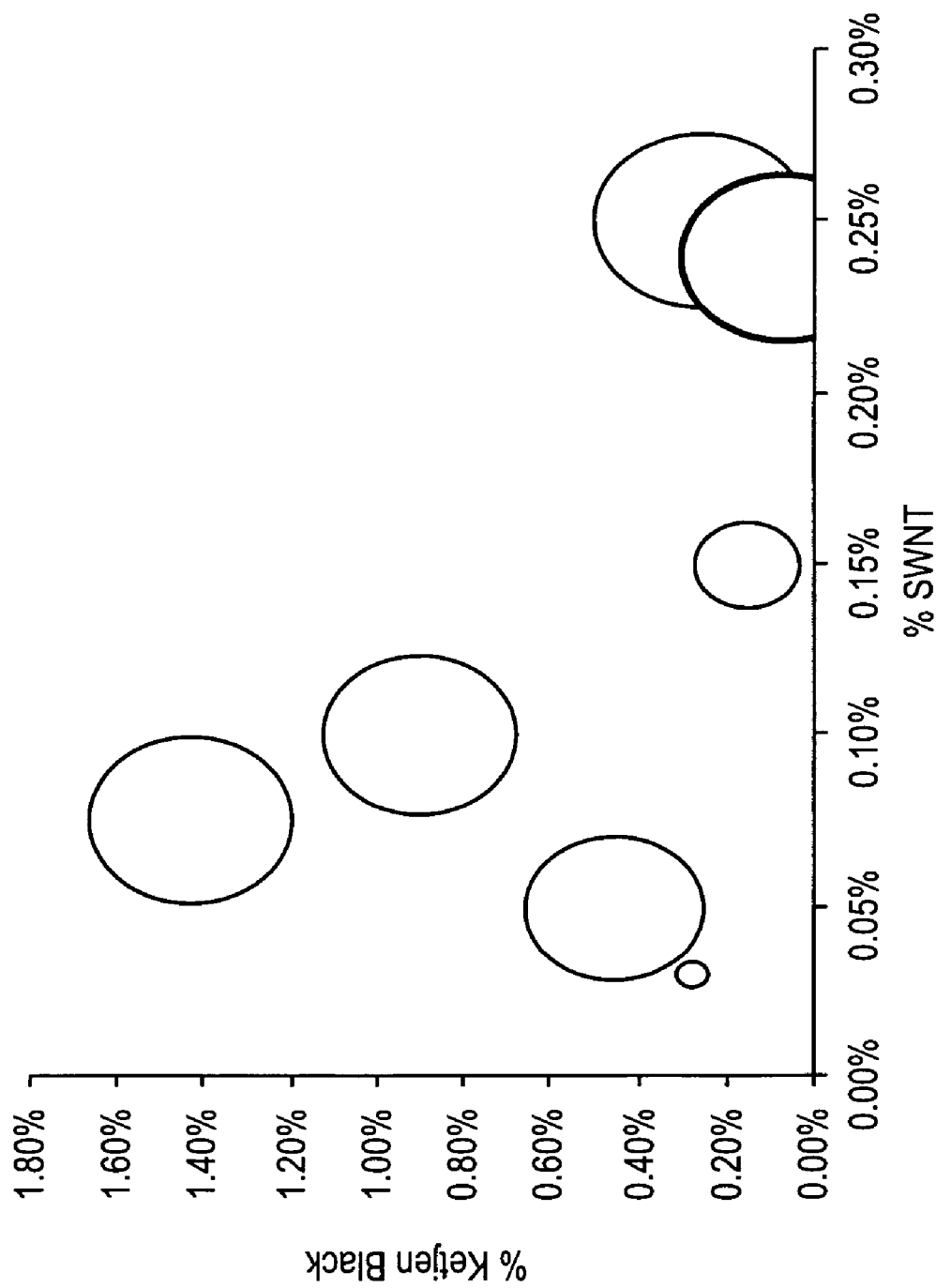
FIG. 1 is a graphical representation demonstrating the synergy between SWNTs and carbon black at higher SWNT loadings.

Disclosed herein are conductive precursor compositions comprising one or more organic polymer precursors, a single wall carbon nanotube (SWNT) composition and optionally at least one nanosized conductive filler. The organic polymer precursors may be monomers, dimers, trimers or molecular species having up to about ten repeat units, or a combination comprising one of the foregoing organic polymer precursors. The nanosized conductive fillers are those wherein a substantial proportion of the fillers having at least one dimension less than or equal to about 100 nanometers (nm). Suitable examples of such dimensions include the side of a face, a diameter, a radius of gyration, and the like.

Disclosed herein too are conductive compositions comprising one or more organic polymers, a SWNT composition and nanosized conductive fillers, that have a bulk volume resistivity less than or equal to about $10^8$ ohm-cm, while displaying impact properties greater than or equal to about 5 kilojoules/square meter and a Class A surface finish. The SWNT composition comprises SWNTs having production related impurities in an amount of greater than or equal to about 1, preferably greater than or equal to about 2, and more preferably greater than or equal to about 5 weight percent (wt %), based on the total weight of the SWNTs. In an advantageous feature, the presence of such production related impurities facilitates the dispersion of the SWNTs within the matrix of the organic polymer and/or promote the use of reduced amounts of energy in the formation of electrically conductive networks through the matrix of the organic polymer.

In one embodiment, the conductive composition has a surface resistivity greater than or equal to about $10^8$ ohm/square (ohm/sq) while having a bulk volume resistivity less than or equal to about $10^8$ ohm-cm, while displaying impact properties greater than or equal to about 5 kilojoules/square meter and a Class A surface finish. In another embodiment, the conductive composition has a surface resistivity less than or equal to about $10^8$ ohm/square (ohm/sq) while having a bulk volume resistivity less than or equal to about $10^8$ ohm-cm, while displaying impact properties greater than or equal to about 5 kilojoules/square meter and a Class A surface finish. Such conductive compositions can be advantageously utilized in computers, electronic goods, semiconductor components, circuit boards, or the like which need to be protected from electrostatic charges. They may also be used advantageously in automotive body panels both for interior and exterior components of automobiles that can be electrostatically painted if desired.

The organic polymer used in the conductive compositions may be selected from a wide variety of thermoplastic resins, blend of thermoplastic resins, thermosetting resins, or blends of thermoplastic resins with thermosetting resins. The organic polymer may also be a blend of polymers, copolymers, terpolymers, or combinations comprising at least one of the foregoing organic polymers. Examples of the organic polymer are polyacetals, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polypyrrolidines, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, or the like, or a combination comprising at least one of the foregoing organic polymers.

Specific non-limiting examples of blends of thermoplastic resins include acrylonitrile-butadiene-styrene/nylon, polycarbonate/acrylonitrile-butadiene-styrene, polyphenylene ether/polystyrene, polyphenylene ether/polyamide, polycarbonate/polyester, polyphenylene ether/polyolefin, and combinations comprising at least one of the foregoing blends of thermoplastic resins.

Examples of thermosetting resins include polyurethane, natural rubber, synthetic rubber, epoxy, phenolic, polyesters, polyamides, silicones, and mixtures comprising any one of the foregoing thermosetting resins. Blends of thermoset resins as well as blends of thermoplastic resins with thermosets can be utilized.

In order to derive the conductive composition, the organic polymer is polymerized from an organic polymer precursor while the SWNTs are dispersed in the organic polymer precursor. The organic polymer precursor may be a monomer, dimer, trimer, or an oligomeric reactive species having up to about 40 repeat units, and which upon polymerization, yields an organic polymer having a number average molecular weight of greater than or equal to about 3,000 grams/mole (g/mole), preferably greater than or equal to about 5,000 g/mole, and more preferably greater than or equal to about 10,000 g/mole. The following sections detail examples of various organic polymers as well as the polymer precursors from which these organic polymers are polymerized. The polymer precursors are examples of monomers that may be combined with the SWNTs and the optional nanosized conductive fillers to obtain the conductive precursor composition.

In one embodiment, an organic polymer that may be used in the conductive composition is a polyarylene ether. The term poly(arylene ether) polymer includes polyphenylene ether (PPE) and poly(arylene ether) copolymers; graft copolymers; poly(arylene ether) ionomers; and block copolymers of alkenyl aromatic compounds with poly(arylene ether)s, vinyl aromatic compounds, and poly(arylene ether), and the like; and combinations comprising at least one of the foregoing. Poly(arylene ether) polymers per se, are polymers comprising a plurality of polymer precursors having structural units of the formula (I):

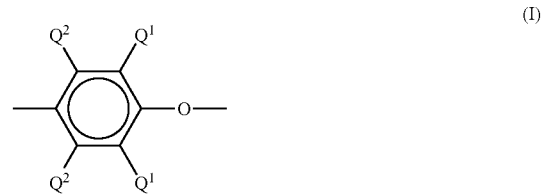

wherein for each structural unit, each $Q^1$ is independently hydrogen, halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether)s are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction with the hydroxy groups of two poly(arylene ether) chains to produce a higher molecular weight polymer. Poly(arylene ether)s further include combinations comprising at least one of the above.

The poly(arylene ether) has a number average molecular weight of about 3,000 to about 30,000 g/mole and a weight average molecular weight of about 30,000 to about 60,000 g/mole, as determined by gel permeation chromatography. The poly(arylene ether) may have an intrinsic viscosity of about 0.10 to about 0.60 deciliters per gram (dl/g), as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly(arylene ether) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese, or cobalt compound, usually in combination with various other materials.

Particularly useful poly(arylene ether)s for many purposes are those, which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

In another embodiment, the organic polymer used in the conductive composition may be a polycarbonate. Polycarbonates comprising aromatic carbonate chain units include compositions having structural units of the formula (II):

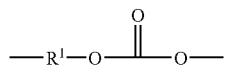

(II)

in which the $R^1$ groups are aromatic, aliphatic or alicyclic radicals. Preferably, $R^1$ is an aromatic organic radical and, more preferably, a radical of the formula (III):

$$-A^1-Y^1-A^2$$ (III)

wherein each of $A^1$ and $A^2$ is a monocyclic divalent aryl radical and $Y^1$ is a bridging radical having zero, one, or two atoms which separate $A^1$ from $A^2$. In an exemplary embodiment, one atom separates $A^1$ from $A^2$. Illustrative examples of radicals of this type are —O—, —S—, —S(O)—, —S(O$_2$)—, —C(O)—, methylene, cyclohexyl-methylene, 2-[2,2,1]-bicycloheptylidene, ethylidene, isopropylidene, neopentylidene, cyclohexylidene, cyclopentadecylidene, cyclododecylidene, adamantylidene, or the like. In another embodiment, zero atoms separate $A^1$ from $A^2$, with an illustrative example being bisphenol. The bridging radical $Y^1$ can be a hydrocarbon group or a saturated hydrocarbon group such as methylene, cyclohexylidene or isopropylidene.

Polycarbonates may be produced by the Schotten-Baumann interfacial reaction of the carbonate precursor with dihydroxy compounds. Typically, an aqueous base such as sodium hydroxide, potassium hydroxide, calcium hydroxide, or the like, is mixed with an organic, water immiscible solvent such as benzene, toluene, carbon disulfide, or dichloromethane, which contains the dihydroxy compound. A phase transfer agent is generally used to facilitate the reaction. Molecular weight regulators may be added either singly or in admixture to the reactant mixture. Branching agents, described forthwith may also be added singly or in admixture.

Polycarbonates can be produced by the interfacial reaction polymer precursors such as dihydroxy compounds in which only one atom separates $A^1$ and $A^2$. As used herein, the term "dihydroxy compound" includes, for example, bisphenol compounds having general formula (IV) as follows:

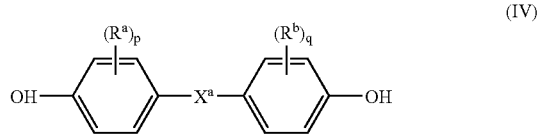

(IV)

wherein $R^a$ and $R^b$ each independently represent hydrogen, a halogen atom, or a monovalent hydrocarbon group; p and q are each independently integers from 0 to 4; and $X^a$ represents one of the groups of formula (V):

(V)

wherein $R^c$ and $R^d$ each independently represent a hydrogen atom or a monovalent linear or cyclic hydrocarbon group, and $R^e$ is a divalent hydrocarbon group.

Examples of the types of bisphenol compounds that may be represented by formula (IV) include the bis(hydroxyaryl) alkane series such as, 1,1-bis(4-hydroxyphenyl)methane, 1,1-bis(4-hydroxyphenyl)ethane, 2,2-bis(4-hydroxyphenyl) propane (or bisphenol-A), 2,2-bis(4-hydroxyphenyl)butane, 2,2-bis(4-hydroxyphenyl)octane, 1,1-bis(4-hydroxyphenyl) propane, 1,1-bis(4 -hydroxyphenyl)n-butane, bis(4-hydroxyphenyl)phenylmethane, 2,2-bis(4-hydroxy-1-methylphenyl)propane, 1,1-bis(4-hydroxy-t-butylphenyl)propane, 2,2-bis(4-hydroxy-3-bromophenyl)propane, or the like; bis (hydroxyaryl)cycloalkane series such as, 1,1-bis(4-hydroxyphenyl)cyclopentane, 1,1-bis(4-hydroxyphenyl) cyclohexane, or the like, or combinations comprising at least one of the foregoing bisphenol compounds.

Other bisphenol compounds that may be represented by formula (IV) include those where X is —O—, —S—, —SO— or —SO$_2$—. Some examples of such bisphenol compounds are bis(hydroxyaryl)ethers such as 4,4'-dihydroxy diphenylether, 4,4'-dihydroxy-3,3'-dimethylphenyl ether, or the like; bis(hydroxy diaryl)sulfides, such as 4,4'-dihydroxy diphenyl sulfide, 4,4'-dihydroxy-3,3'-dimethyl diphenyl sulfide, or the like; bis(hydroxy diaryl)sulfoxides, such as, 4,4'-dihydroxy diphenyl sulfoxides, 4,4'-dihydroxy-3,3'-dimethyl diphenyl sulfoxides, or the like; bis(hydroxy diaryl)sulfones, such as 4,4'-dihydroxy diphenyl sulfone, 4,4'-dihydroxy-3,3'-dimethyl diphenyl sulfone, or the like; or combinations comprising at least one of the foregoing bisphenol compounds.

Other bisphenol compounds that may be utilized in the polycondensation of polycarbonate are represented by the formula (VI)

(VI)

wherein, $R^f$, is a halogen atom of a hydrocarbon group having 1 to 10 carbon atoms or a halogen substituted hydrocarbon group; n is a value from 0 to 4. When n is at least 2, $R^f$ may be the same or different. Examples of bisphenol compounds that may be represented by the formula (V), are resorcinol, substituted resorcinol compounds such as 3-methyl resorcin, 3-ethyl resorcin, 3-propyl resorcin, 3-butyl resorcin, 3-t-butyl resorcin, 3-phenyl resorcin, 3-cumyl resorcin, 2,3,4,6-tetrafloro resorcin, 2,3,4,6-tetrabromo resorcin, or the like; catechol, hydroquinone, substituted hydroquinones, such as 3-methyl hydroquinone, 3-ethyl hydroquinone, 3-propyl hydroquinone, 3-butyl hydroquinone, 3-t-butyl hydroquinone, 3-phenyl hydroquinone, 3-cumyl hydroquinone, 2,3,5,6-tetramethyl hydroquinone, 2,3,5,6-tetra-t-butyl hydroquinone, 2,3,5,6-tetrafloro hydroquinone, 2,3,5,6-tetrabromo hydroquinone, or the like; or combinations comprising at least one of the foregoing bisphenol compounds.

Bisphenol compounds such as 2,2,2',2'-tetrahydro-3,3,3', 3'-tetramethyl-1, 1'-spirobi-[IH-indene]-6,6'-diol represented by the following formula (VII) may also be used.

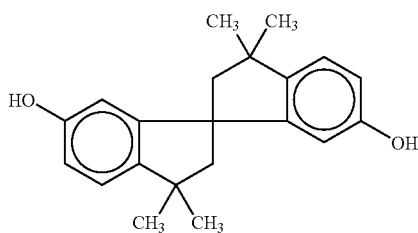

(VII)

The preferred bisphenol compound is bisphenol A.

Typical carbonate precursors include the carbonyl halides, for example carbonyl chloride (phosgene), and carbonyl bromide; the bis-haloformates, for example, the bis-haloformates of dihydric phenols such as bisphenol A, hydroquinone, or the like, and the bis-haloformates of glycols such as ethylene glycol and neopentyl glycol; and the diaryl carbonates, such as diphenyl carbonate, di(tolyl) carbonate, and di(naphthyl)carbonate. The preferred carbonate precursor for the interfacial reaction is carbonyl chloride.

It is also possible to employ polycarbonates resulting from the polymerization of two or more different dihydric phenols or a copolymer of a dihydric phenol with a glycol or with a hydroxy- or acid-terminated polyester or with a dibasic acid or with a hydroxy acid or with an aliphatic diacid in the event a carbonate copolymer rather than a homopolymer is desired for use. Generally, useful aliphatic diacids have about 2 to about 40 carbons. A preferred aliphatic diacid is dodecanedioic acid.

Branched polycarbonates, as well as blends of linear polycarbonate and a branched polycarbonate may also be used in the composition. The branched polycarbonates may be prepared by adding a branching agent during polymerization. These branching agents may comprise polyfunctional organic compounds containing at least three functional groups, which may be hydroxyl, carboxyl, carboxylic anhydride, haloformyl, and combinations comprising at least one of the foregoing branching agents. Specific examples include trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4(4(1,1-bis(p-hydroxyphenyl)-ethyl) α,α-dimethyl benzyl)phenol), 4-chloroformyl phthalic anhydride, trimesic acid, benzophenone tetracarboxylic acid, or the like, or combinations comprising at least one of the foregoing branching agents. The branching agents may be added at a level of about 0.05 to about 2.0 weight percent (wt %), based upon the total weight of the polycarbonate in a given layer.

In one embodiment, the polycarbonate may be produced by a melt polycondensation reaction between a dihydroxy compound and a carbonic acid diester. Examples of the carbonic acid diesters that may be utilized to produce the polycarbonates are diphenyl carbonate, bis(2,4-dichlorophenyl)carbonate, bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, bis(methylsalicyl)carbonate, diethyl carbonate, dimethyl carbonate, dibutyl carbonate, dicyclohexyl carbonate, or the like, or combinations comprising at least one of the foregoing carbonic acid diesters. The preferred carbonic acid diester is diphenyl carbonate or bis(methylsalicyl)carbonate.

Preferably, the number average molecular weight of the polycarbonate is about 3,000 to about 1,000,000 grams/mole (g/mole). Within this range, it is desirable to have a number average molecular weight of greater than or equal to about 10,000, preferably greater than or equal to about 20,000; and more preferably greater than or equal to about 25,000 g/mole. Also desirable is a number average molecular weight of less than or equal to about 100,000, preferably less than or equal to about 75,000, more preferably less than or equal to about 50,000, and most preferably less than or equal to about 35,000 g/mole.

Cycloaliphatic polyesters may also be used in the conductive composition and are generally prepared by reaction of organic polymer precursors such as a diol with a dibasic acid or derivative. The diols useful in the preparation of the cycloaliphatic polyester polymers are straight chain, branched, or cycloaliphatic, preferably straight chain or branched alkane diols, and may contain from 2 to 12 carbon atoms.

Suitable examples of diols include ethylene glycol, propylene glycol, i.e., 1,2 - and 1,3-propylene glycol; butane diol, i.e., 1,3 - and 1,4-butane diol; diethylene glycol, 2,2-dimethyl-1,3-propane diol, 2-ethyl, 2-methyl, 1,3-propane diol, 1,3 - and 1,5-pentane diol, dipropylene glycol, 2-methyl-1,5-pentane diol, 1,6-hexane diol, 1,4-cyclohexane dimethanol and particularly its cis- and trans-isomers, triethylene glycol, 1,10-decane diol, and mixtures of any of the foregoing. Particularly preferred is dimethanol bicyclo octane, dimethanol decalin, a cycloaliphatic diol or chemical equivalents thereof and particularly 1,4-cyclohexane dimethanol or its chemical equivalents. If 1,4-cyclohexane dimethanol is to be used as the diol component, it is generally preferred to use a mixture of cis- to trans-isomers in mole ratios of about 1:4 to about 4:1. Within this range, it is generally desired to use a mole ratio of cis- to trans-isomers of about 1:3.

The diacids useful in the preparation of the cycloaliphatic polyester polymers are aliphatic diacids that include carboxylic acids having two carboxyl groups each of which are attached to a saturated carbon in a saturated ring. Suitable examples of cycloaliphatic acids include decahydro naphthalene dicarboxylic acid, norbornene dicarboxylic acids, bicyclo octane dicarboxylic acids. Preferred cycloaliphatic diacids are 1,4-cyclohexanedicarboxylic acid and trans-1,4-cyclohexanedicarboxylic acids. Linear aliphatic diacids are also useful when the polyester has at least one monomer containing a cycloaliphatic ring. Illustrative examples of linear aliphatic diacids are succinic acid, adipic acid, dimethyl succinic acid, and azelaic acid. Mixtures of diacid and diols may also be used to make the cycloaliphatic polyesters.

Cyclohexanedicarboxylic acids and their chemical equivalents can be prepared, for example, by the hydrogenation of cycloaromatic diacids and corresponding derivatives such as isophthalic acid, terephthalic acid or naphthalenic acid in a suitable solvent, water or acetic acid at room temperature and at atmospheric pressure using suitable catalysts such as rhodium supported on a suitable carrier of carbon or alumina. They may also be prepared by the use of an inert liquid medium wherein an acid is at least partially soluble under reaction conditions and a catalyst of palladium or ruthenium in carbon or silica is used.

Typically, during hydrogenation, two or more isomers are obtained wherein the carboxylic acid groups are in either the cis- or trans-positions. The cis- and trans-isomers can be separated by crystallization with or without a solvent, for example, n-heptane, or by distillation. While the cis-isomer tends to blend better, the trans-isomer has higher melting and crystallization temperature and is generally preferred. Mixtures of the cis- and trans-isomers may also be used, and preferably when such a mixture is used, the trans-isomer will preferably comprise at least about 75 wt % and the cis-isomer will comprise the remainder based on the total weight of cis- and trans-isomers combined. When a mixture of isomers or more than one diacid is used, a copolyester or a mixture of two polyesters may be used as the cycloaliphatic polyester resin.

Chemical equivalents of these diacids including esters may also be used in the preparation of the cycloaliphatic polyesters. Suitable examples of the chemical equivalents of the diacids are alkyl esters, e.g., dialkyl esters, diaryl esters, anhydrides, acid chlorides, acid bromides, or the like, or combinations comprising at least one of the foregoing chemical equivalents. The preferred chemical equivalents comprise the dialkyl esters of the cycloaliphatic diacids, and the most preferred chemical equivalent comprises the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, wherein two isomers having the carboxylic acid groups in the cis- and trans-positions are obtained. The isomers can be separated, the trans-isomer being especially preferred. Mixtures of the isomers may also be used as detailed above.

The polyester polymers are generally obtained through the condensation or ester interchange polymerization of the polymer precursors such as diol or diol chemical equivalent component with the diacid or diacid chemical equivalent component and having recurring units of the formula (VIII):

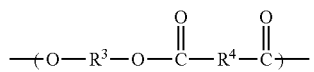

(VIII)

wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^4$ is an alkyl or a cycloaliphatic radical which is the decarboxylated residue derived from a diacid, with the proviso that at least one of $R^3$ or $R^4$ is a cycloalkyl group.

A preferred cycloaliphatic polyester is poly(1,4-cyclohexane-dimethanol-1,4-cyclohexanedicarboxylate) having recurring units of formula (IX)

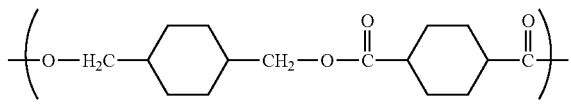

(IX)

wherein in the formula (VIII), $R^3$ is a cyclohexane ring, and wherein $R^4$ is a cyclohexane ring derived from cyclohexanedicarboxylate or a chemical equivalent thereof and is selected from the cis- or trans-isomer or a mixture of cis- and trans-isomers thereof. Cycloaliphatic polyester polymers can be generally made in the presence of a suitable catalyst such as a tetra(2-ethyl hexyl)titanate, in a suitable amount, typically about 50 to 400 ppm of titanium based upon the total weight of the final product. Poly(1,4-cyclohexanedimethanol-1,4-cyclohexanedicarboxylate) generally forms a suitable blend with the polycarbonate. Aromatic polyesters or polyarylates may also be used in the conductive compositions.

Preferably, the number average molecular weight of the copolyestercarbonates or the polyesters is about 3,000 to about 1,000,000 g/mole. Within this range, it is desirable to have a number average molecular weight of greater than or equal to about 10,000, preferably greater than or equal to about 20,000, and more preferably greater than or equal to about 25,000 g/mole. Also desirable is a number average molecular weight of less than or equal to about 100,000, preferably less than or equal to about 75,000, more preferably less than or equal to about 50,000, and most preferably less than or equal to about 35,000 g/mole.

In another embodiment, the organic polymers include polystyrene. The term "polystyrene" as used herein includes polymers prepared by bulk, suspension and emulsion polymerization, which contain at least 25% by weight of polymer precursors having structural units derived from a monomer of the formula (X):

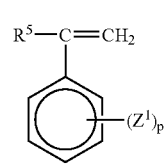

(X)

wherein $R^5$ is hydrogen, lower alkyl or halogen; $Z^1$ is vinyl, halogen or lower alkyl; and p is from 0 to about 5. These organic polymers include homopolymers of styrene, chlorostyrene and vinyltoluene, random copolymers of styrene with one or more monomers illustrated by acrylonitrile, butadiene, alpha-methylstyrene, ethylvinylbenzene, divinylbenzene and maleic anhydride, and rubber-modified polystyrenes comprising blends and grafts, wherein the rubber is a polybutadiene or a rubbery copolymer of about 98 to about 70 wt % styrene and about 2 to about 30 wt % diene monomer. Polystyrenes are miscible with polyphenylene ether in all proportions, and any such blend may contain polystyrene in amounts of about 5 to about 95 wt % and most often about 25 to about 75 wt %, based on the total weight of the polymers.

In yet another embodiment, polyimides may be used as the organic polymers in the conductive compositions. Useful thermoplastic polyimides have the general formula (XI)

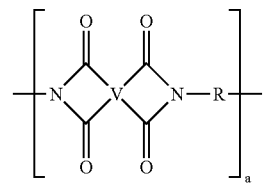

(XI)

wherein a is greater than or equal to about 10, and more preferably greater than or equal to about 1000; and wherein V is a tetravalent linker without limitation, as long as the linker does not impede synthesis or use of the polyimide. Suitable linkers include (a) substituted or unsubstituted, saturated, unsaturated or aromatic monocyclic and polycyclic groups having about 5 to about 50 carbon atoms, (b) substituted or unsubstituted, linear or branched, saturated or unsaturated alkyl groups having 1 to about 30 carbon atoms; or combinations thereof. Suitable substitutions and/or linkers include, but are not limited to, ethers, epoxides, amides, esters, and combinations thereof. Preferred linkers include but are not limited to tetravalent aromatic radicals of formula (XII), such as

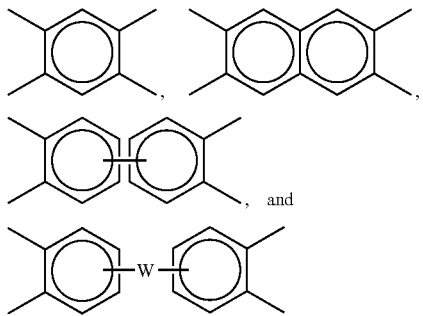
(XII)

wherein W is a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups, or a group of the formula —O-Z-O— wherein the divalent bonds of the —O— or the —O-Z-O— group are in the 3,3',3,4', 4,3', or the 4,4' positions, and wherein Z includes, but is not limited, to divalent radicals of formula (XIII).

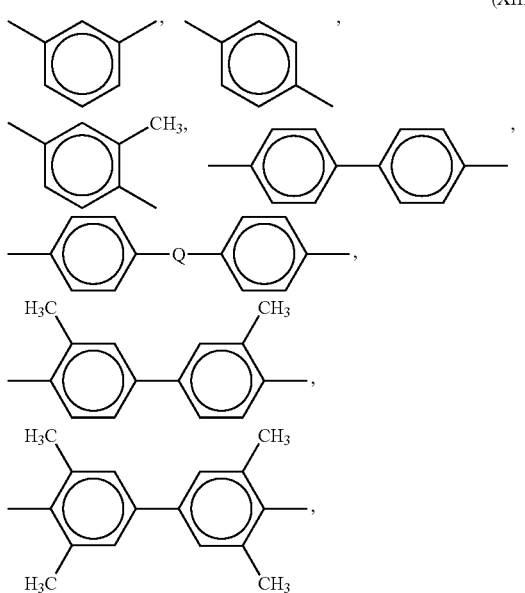
(XIII)

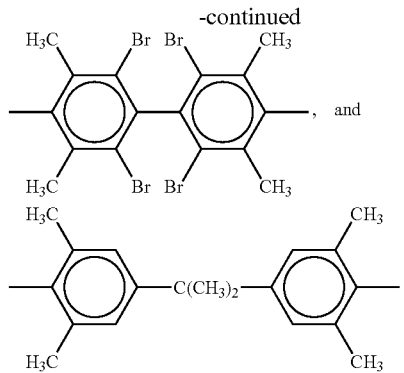
-continued

, and

R in formula (XI) includes substituted or unsubstituted divalent organic radicals such as (a) aromatic hydrocarbon radicals having about 6 to about 20 carbon atoms and halogenated derivatives thereof; (b) straight or branched chain alkylene radicals having about 2 to about 20 carbon atoms; (c) cycloalkylene radicals having about 3 to about 20 carbon atoms, or (d) divalent radicals of the general formula (XIV)

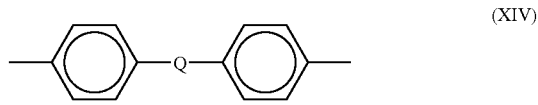
(XIV)

wherein Q includes a divalent moiety selected from the group consisting of —O—, —S—, —C(O)—, —SO$_2$—, —SO—, —C$_y$H$_{2y}$— (y being an integer from 1 to 5), and halogenated derivatives thereof, including perfluoroalkylene groups.

Preferred classes of polyimides that may be used in the conductive compositions include polyamidimides and polyetherimides, particularly those polyetherimides that are melt processable.

Preferred polyetherimide polymers comprise more than 1, preferably about 10 to about 1000 or more, and more preferably about 10 to about 500 structural units, of the formula (XV)

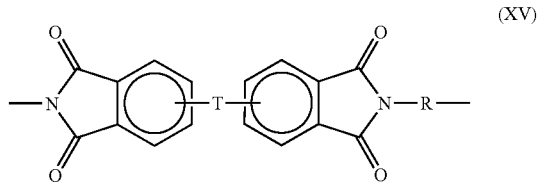
(XV)

wherein T is —O— or a group of the formula —O-Z-O— wherein the divalent bonds of the —O— or the —O-Z-O— group are in the 3,3', 3,4', 4,3', or the 4,4' positions and wherein Z includes, but is not limited, to divalent radicals of formula (XIII) as defined above.

In one embodiment, the polyetherimide may be a copolymer, which, in addition to the etherimide units described above, further contains polyimide structural units of the formula (XVI)

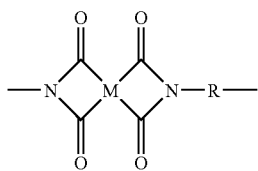

(XVI)

wherein R is as previously defined for formula (XI) and M includes, but is not limited to, radicals of formula (XVII).

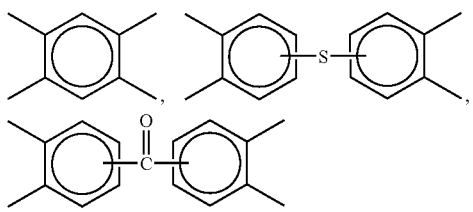

(XVII)

The polyetherimide can be prepared by any of the methods including the reaction of an aromatic bis(ether anhydride) of the formula (XVIII)

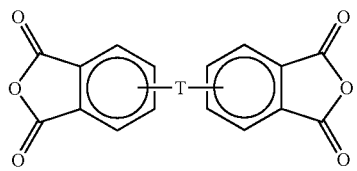

(XVIII)

with an organic diamine of the formula (XIX)

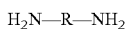

(XIX)

wherein T and R are defined as described above in formulas (XI) and (XIV).

Illustrative examples of aromatic bis(ether anhydride)s of formula (XVIII) include 2,2-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride and 4-(2,3-dicarboxyphenoxy)-4'-(3,4-dicarboxyphenoxy)diphenyl sulfone dianhydride, as well as various mixtures thereof.

The bis(ether anhydride)s can be prepared by the hydrolysis, followed by dehydration, of the reaction product of a nitro substituted phenyl dinitrile with a metal salt of dihydric phenol compound in the presence of a dipolar, aprotic solvent. A preferred class of aromatic bis(ether anhydride)s included by formula (XVIII) above includes, but is not limited to, compounds wherein T is of the formula (XX)

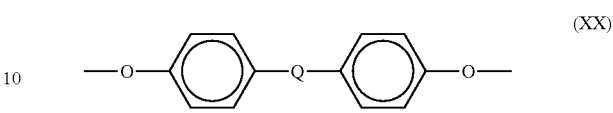

(XX)

and the ether linkages, for example, are preferably in the 3,3', 3,4', 4,3', or 4,4' positions, and mixtures thereof, and where Q is as defined above.

Any diamino compound may be employed in the preparation of the polyimides and/or polyetherimides. Examples of suitable compounds are ethylenediamine, propylenediamine, trimethylenediamine diethylenetriamine, triethylenetertramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy) ethane, bis(3-aminopropyl)sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl)propane, 2,4-bis(b-amino-t-butyl)toluene, bis (p-b-amino-t-butylphenyl) ether, bis(p-b-methyl-o-aminophenyl)benzene, bis(p-b-methyl-o-aminopentyl) benzene, 1,3-diamino-4-isopropylbenzene, bis(4-aminophenyl)sulfide, bis(4-aminophenyl)sulfone, bis(4-aminophenyl) ether and 1,3-bis(3-aminopropyl) tetramethyldisiloxane. Mixtures of these compounds may also be present. The preferred diamino compounds are aromatic diamines, especially m- and p-phenylenediamine and mixtures thereof.

In an exemplary embodiment, the polyetherimide resin comprises structural units according to formula (XV) wherein each R is independently p-phenylene or m-phenylene or a mixture thereof and T is a divalent radical of the formula (XXI)

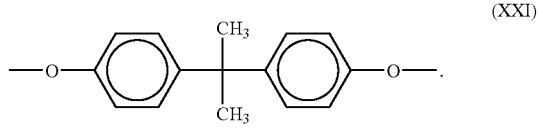

(XXI)

In general, the reactions can be carried out employing solvents such as o-dichlorobenzene, m-cresol/toluene, or the like, to effect a reaction between the anhydride of formula (XVIII) and the diamine of formula (XIX), at temperatures of about 100° C. to about 250° C. Alternatively, the polyetherimide can be prepared by melt polymerization of aromatic bis(ether anhydride)s of formula (XVIII) and diamines of formula (XIX) by heating a mixture of the starting materials to elevated temperatures with concurrent stirring. Generally, melt polymerizations employ temperatures of about 200° C. to about 400° C. Chain stoppers and branching agents may also be employed in the reaction. When polyetherimide/polyimide copolymers are employed, a dianhydride, such as pyromellitic anhydride, is used in combination with the bis(ether anhydride). The polyetherimide polymers can optionally be prepared from reaction of an aromatic bis(ether anhydride) with an organic diamine in which the diamine is present in the reaction mixture at no more than about 0.2 molar excess, and preferably less than about 0.2 molar excess. Under such conditions the polyetherimide resin has less than about 15 microequivalents per gram (µeq/g) acid titratable groups, and preferably less than about 10 µeq/g acid titratable groups, as shown by titration with chloroform solution with a solution of 33 weight percent (wt %) hydrobromic acid in glacial acetic acid. Acid-titratable groups are essentially due to amine endgroups in the polyetherimide resin.

Generally, useful polyetherimides have a melt index of about 0.1 to about 10 grams per minute (g/min), as measured by American Society for Testing Materials (ASTM) D1238 at 295° C., using a 6.6 kilogram (kg) weight. In a preferred embodiment, the polyetherimide resin has a weight average molecular weight (Mw) of about 10,000 to about 150,000 grams per mole (g/mole), as measured by gel permeation chromatography, using a polystyrene standard. Such polyetherimide polymers typically have an intrinsic viscosity greater than about 0.2 deciliters per gram (dl/g), preferably about 0.35 to about 0.7 dl/g measured in m-cresol at 25° C.

In yet another embodiment, polyamides may be used as the organic polymers in the conductive composition. Polyamides are generally derived from the polymerization of organic lactams having from 4 to 12 carbon atoms. Preferred lactams are represented by the formula (XXII)

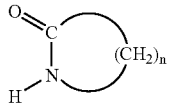

(XXII)

wherein n is about 3 to about 11. A highly preferred lactam is epsilon-caprolactam having n equal to 5.

Polyamides may also be synthesized from amino acids having from 4 to 12 carbon atoms. Preferred amino acids are represented by the formula (XXIII)

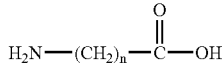

(XXIII)

wherein n is about 3 to about 11. A highly preferred amino acid is epsilon-aminocaproic acid with n equal to 5.

Polyamides may also be polymerized from aliphatic dicarboxylic acids having from 4 to 12 carbon atoms and aliphatic diamines having from 2 to 12 carbon atoms. Suitable and preferred aliphatic dicarboxylic acids are the same as those described above for the synthesis of polyesters. Preferred aliphatic diamines are represented by the formula (XXIV)

$$H_2N-(CH_2)_n-NH_2 \qquad (XXIV)$$

wherein n is about 2 to about 12. A highly preferred aliphatic diamine is hexamethylenediamine ($H_2N(CH_2)_6NH_2$). It is preferred that the molar ratio of the dicarboxylic acid to the diamine be about 0.66 to about 1.5. Within this range it is generally desirable to have the molar ratio be greater than or equal to about 0.81, preferably greater than or equal to about 0.96. Also desirable within this range is an amount of less than or equal to about 1.22, preferably less than or equal to about 1.04. The preferred polyamides are nylon 6, nylon 6,6, nylon 4,6, nylon 6,12, nylon 10, or the like, or combinations comprising at least one of the foregoing nylons.

Synthesis of polyamideesters may also be accomplished from aliphatic lactones having from 4 to 12 carbon atoms and aliphatic lactams having from 4 to 12 carbon atoms. The aliphatic lactones are the same as those described above for polyester synthesis, and the aliphatic lactams are the same as those described above for the synthesis of polyamides. The ratio of aliphatic lactone to aliphatic lactam may vary widely depending on the desired composition of the final copolymer, as well as the relative reactivity of the lactone and the lactam. A presently preferred initial molar ratio of aliphatic lactam to aliphatic lactone is about 0.5 to about 4. Within this range a molar ratio of greater than or equal to about 1 is desirable. Also desirable is a molar ratio of less than or equal to about 2.

The conductive precursor composition may further comprise a catalyst or an initiator. Generally, any known catalyst or initiator suitable for the corresponding thermal polymerization may be used. Alternatively, the polymerization may be conducted without a catalyst or initiator. For example, in the synthesis of polyamides from aliphatic dicarboxylic acids and aliphatic diamines, no catalyst is required.

For the synthesis of polyamides from lactams, suitable catalysts include water and the omega-amino acids corresponding to the ring-opened (hydrolyzed) lactam used in the synthesis. Other suitable catalysts include metallic aluminum alkylates ($MAl(OR)_3H$; wherein M is an alkali metal or alkaline earth metal, and R is $C_1$-$C_{12}$ alkyl), sodium dihydrobis(2-methoxyethoxy)aluminate, lithium dihydrobis(tert-butoxy)aluminate, aluminum alkylates ($Al(OR)_2R$; wherein R is $C_1$-$C_{12}$ alkyl), N-sodium caprolactam, magnesium chloride or bromide salt of epsilon-caprolactam ($MgXC_6H_{10}NO$, X=Br or Cl), dialkoxy aluminum hydride. Suitable initiators include isophthaloybiscaprolactam, N-acetalcaprolactam, isocyanate epsilon-caprolactam adducts, alcohols (ROH; wherein R is $C_1$-$C_1$-2 alkyl), diols (HO—R—OH; wherein R is R is $C_1$-$C_{1-12}$ alkylene), omega-aminocaproic acids, and sodium methoxide.

For the synthesis of polyamideesters from lactones and lactams, suitable catalysts include metal hydride compounds, such as a lithium aluminum hydride catalysts having the formula $LiAl(H)_x(R^1)_y$, where x is about 1 to about 4, y is about 0 to about 3, x+y is equal to 4, and $R^1$ is selected from the group consisting of $C_1$-$C_{12}$ alkyl and $C_1$-$C_{12}$ alkoxy; highly preferred catalysts include $LiAl(H)(OR^2)_3$, wherein $R^2$ is selected from the group consisting of $C_1$-$C_8$ alkyl; an especially preferred catalyst is $LiAl(H)(OC(CH_3)_3)_3$. Other suitable catalysts and initiators include those described above for the polymerization of poly(epsilon-caprolactam) and poly(epsilon-caprolactone).

The organic polymer is generally present in amounts of about 5 to about 99.999 weight percent (wt %) in the conductive composition. Within this range, it is generally desirable use the organic polymer or the polymeric blend in an amount of greater than or equal to about 10 wt %, preferably greater or equal to about 30 wt %, and more preferably greater than or equal to about 50 wt % of the total weight of the composition. The organic polymers or polymeric blends are furthermore generally used in amounts less than or equal to about 99.99 wt %, preferably less than or equal to about 99.5 wt %, more preferably less than or equal to about 99.3 wt % of the total weight of the composition.

The organic polymer precursor is present in amounts of about 2 to about 99.999 weight percent (wt %) in the conductive precursor composition. Within this range, it is generally desirable use the organic polymer precursors in an amount of greater than or equal to about 10 wt %, preferably greater or equal to about 30 wt %, and more preferably greater than or equal to about 50 wt % of the total weight of the conductive precursor composition. The organic polymer precursors are furthermore generally used in amounts less than or equal to about 99.99 wt %, preferably less than or equal to about 99.5 wt %, more preferably less than or equal to about 99.3 wt % of the total weight of the conductive precursor composition.

SWNTs used in the composition may be produced by laser-evaporation of graphite, carbon arc synthesis or the high-pressure carbon monoxide conversion process (HIPCO) process. These SWNTs generally have a single wall comprising a graphene sheet with outer diameters of about 0.7 to about 2.4 nanometers (nm). SWNTs having aspect ratios of greater than or equal to about 5, preferably greater than or equal to about 100, more preferably greater than or equal to about 1000 are generally utilized in the compositions. While the SWNTs are generally closed structures having hemispherical caps at each end of the respective tubes, it is envisioned that SWNTs having a single open end or both open ends may also be used. The SWNTs generally comprise a central portion, which is hollow, but may be filled with amorphous carbon.

In an exemplary embodiment, the purpose of dispersion of the SWNTs in an organic polymer is to disentangle the SWNTs so as to obtain an effective aspect ratio that is as close to the aspect ratio of the SWNT as possible. The ratio of the effective aspect ratio to the aspect ratio is a measure of the effectiveness of dispersion. The effective aspect ratio is a value that is twice the radius of gyration of a single SWNT divided by the outer diameter of the respective individual nanotube. It is generally desirable for the average value of ratio of the effective aspect ratio to the aspect ratio to be greater than or equal to about 0.5, preferably greater than or equal to about 0.75, and more preferably greater than or equal to about 0.90, as measured in a electron micrograph at a magnification of greater than or equal to about 10,000.

In one embodiment, the SWNTs may exist in the form of rope-like-aggregates. These aggregates are commonly termed "ropes" and are formed as a result of Van der Waal's forces between the individual SWNTs. The individual nanotubes in the ropes may slide against one another and rearrange themselves within the rope in order to minimize the free energy. Ropes generally having between 10 and $10^5$ nanotubes may be used in the compositions. Within this range, it is generally desirable to have ropes having greater than or equal to about 100, preferably greater than or equal to about 500 nanotubes. Also desirable, are ropes having less than or equal to about $10^4$ nanotubes, preferably less than or equal to about 5,000 nanotubes.

In yet another embodiment, it is desirable for the SWNT ropes to connect each other in the form of branches after dispersion. This results in a sharing of the ropes between the branches of the SWNT networks to form a 3-diminsional network in the organic polymer matrix. A distance of about 10 nm to about 10 micrometers may separate the branching points in this type of network. It is generally desirable for the SWNTs to have an inherent thermal conductivity of at least 2000 Watts per meter Kelvin (W/m-K) and for the SWNT ropes to have an inherent electrical conductivity of $10^4$ Siemens/centimeter (S/cm). It is also generally desirable for the SWNTs to have a tensile strength of at least 80 gigapascals (GPa) and a stiffness of at least about 0.5 tarapascals (TPa).

In another embodiment, the SWNTs may comprise a mixture of metallic nanotubes and semi-conducting nanotubes. Metallic nanotubes are those that display electrical characteristics similar to metals, while the semi-conducting nanotubes are those, which are electrically semi-conducting. In general the manner in which the graphene sheet is rolled up produces nanotubes of various helical structures. Zigzag and armchair nanotubes constitute two possible confirmations. In order to minimize the quantity of SWNTs utilized in the composition, it is generally desirable to have the composition comprise as large a fraction of metallic SWNTs. It is generally desirable for the SWNTs used in the composition to comprise metallic nanotubes in an amount of greater than or equal to about 1 wt %, preferably greater than or equal to about 20 wt %, more preferably greater than or equal to about 30 wt %, even more preferably greater than or equal to about 50 wt %, and most preferably greater than or equal to about 99.9 wt % of the total weight of the SWNTs. In certain situations, it is generally desirable for the SWNTs used in the composition to comprise semi-conducting nanotubes in an amount of greater than or equal to about 1 wt %, preferably greater than or equal to about 20 wt %, more preferably greater than or equal to about 30 wt %, even more preferably greater than or equal to about 50 wt %, and most preferably greater than or equal to about 99.9 wt % of the total weight of the SWNTs.

SWNTs are generally used in amounts of about 0.001 to about 80 wt % of the total weight of the composition when desirable. Within this range, SWNTs are generally used in amounts greater than or equal to about 0.25 wt %, preferably greater or equal to about 0.5 wt %, more preferably greater than or equal to about 1 wt % of the total weight of the composition. SWNTs are furthermore generally used in amounts less than or equal to about 30 wt %, preferably less than or equal to about 10 wt %, more preferably less than or equal to about 5 wt % of the total weight of the composition.

In one embodiment, the SWNTs may contain production related impurities. Production related impurities present in SWNTs as defined herein are those impurities, which are produced during processes substantially related to the production of SWNTs. As stated above, SWNTs are produced in processes such as, for example, laser ablation, chemical vapor deposition, carbon arc, high-pressure carbon monoxide conversion processes, or the like. Production related impurities are those impurities that are either formed naturally or formed deliberately during the production of SWNTs in the aforementioned processes or similar manufacturing processes. A suitable example of a production related impurity that is formed naturally are catalyst particles used in the production of the SWNTs. A suitable example of a production related impurity that is formed deliberately is a dangling bond formed on the surface of the SWNT by the deliberate addition of a small amount of an oxidizing agent during the manufacturing process.

Production related impurities include for example, carbonaceous reaction by-products such as defective SWNTs, multiwall carbon nanotubes, branched or coiled multiwall carbon nanotubes, amorphous carbon, soot, nano-onions, nanohorns, coke, or the like; catalytic residues from the catalysts utilized in the production process such as metals, metal oxides, metal-carbides, metal nitrides or the like, or combinations comprising at least one of the foregoing reaction byproducts. A process that is substantially related to the production of SWNTs is one in which the fraction of SWNTs is larger when compared with any other fraction of production related impurities. In order for a process to be substantially related to the production of SWNTs, the fraction of SWNTs would have to be greater than a fraction of any one of the above listed reaction byproducts or catalytic residues. For example, the fraction of SWNTs would have to be greater than the fraction of multiwall nanotubes, or the fraction of soot, or the fraction of carbon black. The fraction of SWNTs would not have to be greater than the sums of the fractions of any combination of production related impurities for the process to be considered substantially directed to the production of SWNTs.

In general, the SWNTs used in the composition may comprise an amount of about 0.1 to about 80 wt % impurities. Within this range, the SWNTs may have an impurity content greater than or equal to about 1, preferably greater than or equal to about 3, preferably greater than or equal to about 7, and more preferably greater than or equal to about 8 wt %, of the total weight of the SWNTs. Also desirable within this range, is an impurity content of less than of equal to about 50, preferably less than or equal to about 45, and more preferably less than or equal to about 40 wt % of the total weight of the SWNTs.

In one embodiment, the SWNTs used in the composition may comprise an amount of about 0.1 to about 50 wt % catalytic residues. Within this range, the SWNTs may have a catalytic residue content greater than or equal to about 3, preferably greater than or equal to about 7, and more preferably greater than or equal to about 8 wt %, of the total weight of the SWNTs. Also desirable within this range, is a catalytic residue content of less than of equal to about 50, preferably less than or equal to about 45, and more preferably less than or equal to about 40 wt % of the total weight of the SWNTs.

The nanosized conductive filler are those having at least one dimension less than or equal to about 1,000 nm. The nanosized conductive fillers may be 1, 2 or 3-dimensional and may exist in the form of powder, drawn wires, strands, fibers; tubes, nanotubes, rods, whiskers, flakes, laminates, platelets, ellipsoids, discs, spheroids, and the like, or combinations comprising at least one of the foregoing forms. They may also have fractional dimensions and may exist in the form of mass or surface fractals.

Suitable examples of nanosized conductive fillers are multiwall carbon nanotubes (MWNTs), vapor grown carbon fibers (VGCF), carbon black, graphite, conductive metal particles, conductive metal oxides, metal coated fillers, nanosized conducting organic/organometallic fillers conductive polymers, and the like, and combinations comprising at least one of the foregoing nanosized conductive fillers. In one embodiment, these nanosized conductive fillers may be added to the conductive precursor composition during the polymerization of the polymeric precursor. In another embodiment, the nanosized conductive fillers are added to the organic polymer and the SWNT composition during manufacturing to form the conductive composition.

MWNTs derived from processes such as laser ablation and carbon arc synthesis that are not directed at the production of SWNTs, may also be used in the compositions. MWNTs have at least two graphene layers bound around an inner hollow core. Hemispherical caps generally close both ends of the MWNTs, but it may desirable to use MWNTs having only one hemispherical cap or MWNTs, which are devoid of both caps. MWNTs generally have diameters of about 2 to about 50 nm. Within this range, it is generally desirable to use MWNTs having diameters less than or equal to about 40, preferably less than or equal to about 30, and more preferably less than or equal to about 20 nm. When MWNTs are used, it is preferred to have an average aspect ratio greater than or equal to about 5; preferably greater than or equal to about 100, more preferably greater than or equal to about 1000.

MWNTs are generally used in amounts of about 0.001 to about 50 wt % of the total weight of the conductive precursor composition and/or the conductive composition when desirable. Within this range, MWNTs are generally used in amounts greater than or equal to about 0.25 wt %, preferably greater or equal to about 0.5 wt %, more preferably greater than or equal to about 1 wt % of the total weight of the conductive precursor composition and/or the conductive composition. MWNTs are furthermore generally used in amounts less than or equal to about 30 wt %, preferably less than or equal to about 10 wt %, more preferably less than or equal to about 5 wt % of the total weight of the conductive precursor composition and/or the conductive composition.

Vapor grown carbon fibers or small graphitic or partially graphitic carbon fibers, also referred to as vapor grown carbon fibers (VGCF), having diameters of about 3.5 to about 100 nanometers (nm) and an aspect ratio greater than or equal to about 5 may also be used. When VGCF are used, diameters of about 3.5 to about 70 nm are preferred, with diameters of about 3.5 to about 50 nm being more preferred, and diameters of about 3.5 to about 25 nm most preferred. It is also preferable to have average aspect ratios greater than or equal to about 100 and more preferably greater than or equal to about 1000.

VGCF are generally used in amounts of about 0.001 to about 50 wt % of the total weight of the conductive precursor composition and/or the conductive composition when desirable. Within this range, VGCF are generally used in amounts greater than or equal to about 0.25 wt %, preferably greater or equal to about 0.5 wt %, more preferably greater than or equal to about 1 wt % of the total weight of the conductive precursor composition and/or the conductive composition. VGCF are furthermore generally used in amounts less than or equal to about 30 wt %, preferably less than or equal to about 10 wt %, more preferably less than or equal to about 5 wt % of the total weight of the conductive precursor composition and/or the conductive composition.

Both the SWNTs and the other carbon nanotubes (i.e., the MWNTs and the VGCF) utilized in the conductive precursor composition and/or the conductive composition may also be derivatized with functional groups to improve compatibility and facilitate the mixing with the organic polymer. The SWNTs and the other carbon nanotubes may be functionalized on either the graphene sheet constituting the sidewall, a hemispherical cap or on both the side wall as well as the hemispherical endcap. Functionalized SWNTs and the other carbon nanotubes are those having the formula (XXV)

 (XXV)

wherein n is an integer, L is a number less than 0.1 n, m is a number less than 0.5 n, and wherein each of R is the same and is selected from —SO$_3$H, —NH$_2$, —OH, —C(OH)R', —CHO, —CN, —C(O)Cl, —C(O)SH, —C(O)OR', —SR', —SiR$_3$', —Si(OR')$_y$R'$_{(3-y)}$, —R", —AlR$_2$', halide, ethylenically unsaturated functionalities, epoxide functionalities, or the like, wherein y is an integer equal to or less than 3, R' is hydrogen, alkyl, aryl, cycloalkyl, alkaryl, aralkyl, cycloaryl, poly(alkylether), bromo, chloro, iodo, fluoro, amino, hydroxyl, thio, phosphino, alkylthio, cyano, nitro, amido, carboxyl, heterocyclyl, ferrocenyl, heteroaryl, fluoro substituted alkyl, ester, ketone, carboxylic acid, alcohol, fluoro-substituted carboxylic acid, fluoro-alkyl-triflate, or the like, and R" is fluoroalkyl, fluoroaryl, fluorocycloalkyl, fluoroaralkyl, cycloaryl, or the like. The carbon atoms, $C_n$, are surface carbons of a carbon nanotube. In both, uniformly and non-uniformly substituted SWNTs and other carbon nanotubes, the surface atoms $C_n$ are reacted.

Non-uniformly substituted SWNTs and other carbon nanotubes may also be used in the conductive precursor composition and/or the conductive composition. These include compositions of the formula (I) shown above wherein n, L, m, R and the SWNT itself are as defined above, provided that each of R does not contain oxygen, or, if each of R is an oxygen-containing group, COOH is not present.

Also included are functionalized SWNTs and other carbon nanotubes having the formula (XXVI)

$$[C_nH_L]\text{---}[R''\text{---}R]_m \qquad (XXVI)$$

where n, L, m, R' and R have the same meaning as above. Most carbon atoms in the surface layer of a carbon nanotube are basal plane carbons. Basal plane carbons are relatively inert to chemical attack. At defect sites, where, for example, the graphitic plane fails to extend fully around the carbon nanotube, there are carbon atoms analogous to the edge carbon atoms of a graphite plane. The edge carbons are reactive and must contain some heteroatom or group to satisfy carbon valency.

The substituted SWNTs and other carbon nanotubes described above may advantageously be further functionalized. Such SWNT compositions include compositions of the formula (XXVII)

$$[C_nH_L]\text{---}A_m \qquad (XXVII)$$

where n, L and m are as described above, A is selected from —OY, —NHY, —CR'$_2$—OY, —C(O)OY, —C(O)NR'Y, —C(O)SY, or —C(O)Y, wherein Y is an appropriate functional group of a protein, a peptide, an enzyme, an antibody, a nucleotide, an oligonucleotide, an antigen, or an enzyme substrate, enzyme inhibitor or the transition state analog of an enzyme substrate or is selected from —R'OH, —R'NH$_2$, —R'SH, —R'CHO, —R'CN, —R'X, —R'SiR'$_3$, —RSi—(OR')$_y$—R'$_{(3-y)}$, —R'Si—(O—SiR'$_2$)—OR', —R'—R", —R'—NCO, (C$_2$H$_4$O)$_w$Y, —(C$_3$H$_6$O)$_w$H, —(C$_2$H$_4$O)$_w$R', —(C$_3$H$_6$O)$_w$R' and R", wherein w is an integer greater than one and less than 200.

The functional SWNTs and other carbon nanotubes of structure (XXVI) may also be functionalized to produce SWNT compositions having the formula (XXVIII)

$$[C_nH_L]\text{---}[R'\text{---}A]_m \qquad (XXVIII)$$

where n, L, m, R' and A are as defined above.

The conductive precursor composition and/or the conductive composition may also include SWNTs and other carbon nanotubes upon which certain cyclic compounds are adsorbed. These include SWNT compositions of matter of the formula (XXIX)

$$[C_nH_L]\text{---}[X\text{---}R_a]_m \qquad (XXIX)$$

where n is an integer, L is a number less than 0.1 n, m is less than 0.5 n, a is zero or a number less than 10, X is a polynuclear aromatic, polyheteronuclear aromatic or inetal-lopolyheteronuclear aromatic moiety and R is as recited above. Preferred cyclic compounds are planar macrocycles such as re porphyrins and phthalocyanines.

The adsorbed cyclic compounds may be functionalized. Such SWNT compositions include compounds of the formula (XXX)

$$[C_nH_L]\text{---}[X\text{---}A_a]_m \qquad (XXX)$$

where m, n, L, a, X and A are as defined above and the carbons are on the SWNT or on other nanotubes such as MWNTs, VGCF, or the like.

Without being bound to a particular theory, the functionalized SWNTs and other carbon nanotubes are better dispersed into the organic polymers because the modified surface properties may render the carbon nanotube more compatible with the organic polymer, or, because the modified functional groups (particularly hydroxyl or amine groups) are bonded directly to the organic polymer as terminal groups. In this way, organic polymers such as polycarbonates, polyamides, polyesters, polyetherimides, or the like, bond directly to the carbon nanotubes, thus making the carbon nanotubes easier to disperse with improved adherence to the organic polymer.

Functional groups may generally be introduced onto the outer surface of the SWNTs and the other carbon nanotubes by contacting the respective outer surfaces with a strong oxidizing agent for a period of time sufficient to oxidize the surface of the SWNTs and other carbon nanotubes and further contacting the respective outer surfaces with a reactant suitable for adding a functional group to the oxidized surface. Preferred oxidizing agents are comprised of a solution of an alkali metal chlorate in a strong acid. Preferred alkali metal chlorates are sodium chlorate or potassium chlorate. A preferred strong acid used is sulfuric acid. Periods of time sufficient for oxidation are about 0.5 hours to about 24 hours.

Carbon black may also be used in the conductive precursor composition and/or the conductive composition. Preferred carbon blacks are those having average particle sizes less than about 100 nm, preferably less than about 70 nm, more preferably less than about 50 nm. Preferred conductive carbon blacks may also have surface areas greater than about 200 square meter per gram (m$^2$/g), preferably greater than about 400 m$^2$/g, yet more preferably greater than about 1000 m$^2$/g. Preferred conductive carbon blacks may have a pore volume (dibutyl phthalate absorption) greater than about 40 cubic centimeters per hundred grams (cm$^3$/100 g), preferably greater than about 100 cm$^3$/100 g, more preferably greater than about 150 cm$^3$/100 g. Exemplary carbon blacks include the carbon black commercially available from Columbian Chemicals under the trade name Conductex®; the acetylene black available from Chevron Chemical, under the trade names S.C.F. (Super Conductive Furnace) and E.C.F. (Electric Conductive Furnace); the carbon blacks available from Cabot Corp. under the trade names Vulcan XC72 and Black Pearls; and the carbon blacks commercially available from Akzo Co. Ltd under the trade names Ketjen Black EC 300 and EC 600. Preferred conductive carbon blacks may be used in amounts from about 0.1 wt % to about 25 wt % based on the total weight of the conductive precursor composition and/or the conductive composition.

Solid conductive metallic fillers may also optionally be used in the conductive precursor composition and/or the conductive composition. These may be electrically conductive metals or alloys that do not melt under conditions used in incorporating them into the organic polymer, and fabricating finished articles therefrom. Metals such as aluminum, copper, magnesium, chromium, tin, nickel, silver, iron, titanium, and mixtures comprising any one of the foregoing metals can be incorporated into the organic polymer as conductive fillers. Physical mixtures and true alloys such as stainless steels, bronzes, and the like, may also serve as conductive filler particles. In addition, a few intermetallic chemical compounds such as borides, carbides, and the like, of these metals, (e.g., titanium diboride) may also serve as conductive filler particles. Solid non-metallic, conductive filler particles such as tin-oxide, indium tin oxide, and the like may also optionally be added to render the organic polymer conductive.

Non-conductive, non-metallic fillers that have been coated over a substantial portion of their surface with a coherent layer of solid conductive metal may also be used conductive precursor composition and/or the conductive composition. The non-conductive, non-metallic fillers are commonly referred to as substrates, and substrates coated with a layer of solid conductive metal may be referred to as "metal coated fillers". Typical conductive metals such as aluminum, copper, magnesium, chromium, tin, nickel, silver, iron, titanium, and mixtures comprising any one of the foregoing metals may be used to coat the substrates. Examples of substrates are well known in the art and include those described in "Plastic Additives Handbook, 5$^{th}$ Edition" Hans Zweifel, Ed, Carl Hanser Verlag Publishers, Munich, 2001. Non-limiting examples of such substrates include silica powder, such as fused silica and crystalline silica, boron-nitride powder, boron-silicate powders, alumina, magnesium oxide (or magnesia), wollastonite, including surface-treated wollastonite, calcium sulfate (as its anhydride, dihydrate or trihydrate), calcium carbonate, including chalk, limestone, marble and synthetic, precipitated calcium carbonates, generally in the form of a ground particulates, talc, including fibrous, modular, needle shaped, and lamellar talc, glass spheres, both hollow and solid, kaolin, including hard, soft, calcined kaolin, and kaolin comprising various coatings known in the art to facilitate compatibility with the polymeric matrix resin, mica, feldspar, silicate spheres, flue dust, cenospheres, fillite, aluminosilicate (armospheres), natural silica sand, quartz, quartzite, perlite, tripoli, diatomaceous earth, synthetic silica, and mixtures comprising any one of the foregoing. All of the above substrates may be coated with a layer of metallic material for use in the conductive precursor composition and/or the conductive composition.

Regardless of the exact size, shape and composition of the solid metallic and non-metallic conductive filler particles, they may be dispersed into the organic polymer at loadings of about 0.001 to about 50 wt % of the total weight of the conductive precursor composition and/or the conductive composition when desired. Within this range it is generally desirable to have the solid metallic and non-metallic conductive filler particles in an amount of greater than or equal to about 1 wt %, preferably greater than or equal to about 1.5 wt % and more preferably greater than or equal to about 2 wt % of the total weight of the conductive precursor composition and/or the conductive composition. The loadings of the solid metallic and non-metallic conductive filler particles may be less than or equal to 40 wt %, preferably less than or equal to about 30 wt %, more preferably less than or equal to about 25 wt % of the total weight of the conductive precursor composition and/or the conductive composition.

Nanosized conducting organic/organometallic fillers may also be used in the conducting compositions. The classes of conducting molecules discussed include conducting hetero tetracyanoquinodimethane (TCNQ), perylene based conductors, doped fullerenes, transition metal complexes and metallophthalocyanine. A suitable example of a weakly conducting nanosized conducting organic/organometallic fillers is phthalo blue (copper phthalocyanine).

The nanosized conducting organic/organometallic fillers are preferably used in amounts of 0.0001 to about 10 wt %, of the total weight of the composition. In general, nanosized conducting organic/organometallic fillers are used in an amount of greater than or equal to about 0.0025 wt %, preferably greater than or equal to about 0.05 wt %, and more preferably greater than or equal to about 0.1 wt %, of the total weight of the composition. The nanosized conducting organic/organometallic fillers are furthermore present in amounts of less than or equal to about 5 wt %, preferably less than or equal to about 2 wt %, and more preferably less than or equal to about 1 wt %, of the total weight of the composition.

Conductive polymers such as polyanilines, polypyrroles, polythiophenes, polyacetylenes, and the like, and combinations comprising at least one of the foregoing may also be used. The conductive polymers are generally used in amounts of 0.0001 to about 10 wt %, of the total weight of the composition. In general, the conductive polymers are used in an amount of greater than or equal to about 0.0025 wt %, preferably greater than or equal to about 0.05 wt %, and more preferably greater than or equal to about 0.1 wt %, of the total weight of the composition. The conductive polymers are furthermore present in amounts of less than or equal to about 5 wt %, preferably less than or equal to about 2 wt %, and more preferably less than or equal to about 1 wt %, of the total weight of the composition.

In one method of manufacturing the conductive precursor composition, the organic polymer precursor together with the SWNT composition and the optional nanosized conductive filler are mixed together in a reaction vessel. The conductive precursor composition may contain solvents such as water, toluene, acetone, chloroform, trichloroethylene, and the like, if desired. The time period for mixing should generally be adequate to disperse the SWNTs and the nanosized conductive fillers in the organic polymer precursors, or to react the organic polymer precursors to form the organic polymer, or to react the organic polymer precursor or the organic polymer with the SWNTs. Examples of reaction vessels where the organic polymer precursor may be mixed with the SWNTs are extruders, Buss kneaders, kettles, tumblers, Henschels, Waring blenders, and the like, or combinations comprising at least one of the foregoing reactors.

In one embodiment, the organic polymer precursor may be mixed with the SWNT and other optional fillers and stored for a desired period prior to reacting the organic polymer precursor into an organic polymer in either the same or a different reaction vessel. In another embodiment, the conductive precursor composition may be mixed in a reaction vessel and the organic polymer precursors may be partially polymerized in a first step, prior to being stored for a desired period of time. The conductive precursor composition may then be subjected to additional polymerization steps to complete the polymerization of the organic polymer.

The organic polymer together with the SWNTs comprising the production related impurities and any other optionally desired conductive fillers such as the carbon black, solid metallic and non-metallic conductive filler particles may generally be processed in several different ways such as, but not limited to melt blending, solution blending, or the like, or combinations comprising at least one of the foregoing methods of blending. Melt blending of the composition involves the use of shear force, extensional force, compressive force, ultrasonic energy, electromagnetic energy, thermal energy or combinations comprising at least one of the foregoing forces or forms of energy and is conducted in processing equipment wherein the aforementioned forces are exerted by a single screw, multiple screws, intermeshing co-rotating or counter rotating screws, non-intermeshing co-rotating or counter rotating screws, reciprocating screws, screws with pins, screws with screens, barrels with pins, rolls, rams, helical rotors, or combinations comprising at least one of the foregoing.

Melt blending involving the aforementioned forces may be conducted in machines such as, but not limited to single or multiple screw extruders, single or multiple screw extruders fitted with ultrasonic horns, Buss kneader, Henschel, helicones, Ross mixer, Banbury, roll mills, molding machines such as injection molding machines, vacuum forming machines, blow molding machine, or then like, or combinations comprising at least one of the foregoing machines.

In one embodiment, the organic polymer in powder form, pellet form, sheet form, or the like, may be first dry blended with the SWNTs and other optional fillers if desired in a Henschel or a roll mill, prior to being fed into a melt blending device such as an extruder or Buss kneader. While it is generally desirable for the shear forces in the melt blending device to generally cause a dispersion of the SWNTs in the organic polymer, it is also desired to preserve the aspect ratio of the SWNTs during the melt blending process. In order to do so, it may be desirable to introduce the SWNTs and optionally other nanosized conducting fillers into the melt blending device in the form of a masterbatch. In such a process, the masterbatch may be introduced into the melt blending device downstream of the organic polymer.

A melt blend is one where at least a portion of the organic polymer has reached a temperature greater than or equal to about the melting temperature, if the resin is a semi-crystalline organic polymer, or the flow point (e.g., the glass transition temperature) if the resin is an amorphous resin during the blending process. A dry blend is one where the entire mass of organ ic polymer is at a temperature less than or equal to about the melting temperature if the resin is a semi-crystalline organic polymer, or at a temperature less than or equal to the flow point if the organic polymer is an amorphous resin and wherein organic polymer is substantially free of any liquid-like fluid during the blending process. A solution blend, as defined herein, is one where the organic polymer is suspended in a liquid-like fluid such as, for example, a solvent or a non-solvent during the blending process.

When a masterbatch is used, the SWNTs may be present in the masterbatch in an amount of about 0.05 to about 50 wt %. Within this range, it is generally desirable to use SWNTs in an amount of greater than or equal to about 1.5 wt %, preferably greater or equal to about 2 wt %, more preferably greater than or equal to about 2.5 wt % of the total weight of the masterbatch. Also desirable are SWNTs in an amount of less than or equal to about 30 wt %, preferably less than or equal to about 10 wt %, more preferably less than or equal to about 5 wt % of the total weight of the masterbatch. In one embodiment pertaining to the use of masterbatches, while the masterbatch containing the SWNTs may not have a measurable bulk or surface resistivity either when extruded in the form of a strand or molded into the form of dogbone, the resulting composition into which the masterbatch is incorporated has a measurable bulk or surface resistivity, even though the weight fraction of the SWNTs in the composition is lower than that in the masterbatch. It is preferable for the organic polymer in such a masterbatch to be semi-crystalline. Examples of semi-crystalline organic polymers which display these characteristics and which may be used in masterbatches are polypropylene, polyamides, polyesters, or the like, or combinations comprising at least on of the foregoing semi-crystalline organic polymers.

In another embodiment relating to the use of masterbatches in the manufacture of a composition comprising a blend of organic polymers, it is sometimes desirable to have the masterbatch comprising a organic polymer that is the same as the organic polymer that forms the continuous phase of the composition. This feature permits the use of substantially smaller proportions of the SWNTs and other nanosized conductive fillers, since only the continuous phase carries the SWNTs that provide the composition with the requisite volume and surface resistivity. In yet another embodiment relating to the use of masterbatches in polymeric blends, it may be desirable to have the masterbatch comprising a organic polymer that is different in chemistry from other the polymeric that are used in the composition. In this case, the organic polymer of the masterbatch will form the continuous phase in the blend. In yet another embodiment, it may be desirable to use a separate masterbatch comprising multiwall nanotubes, vapor grown carbon fibers, carbon black, conductive metallic fillers, solid non-metallic, conductive fillers, or the like, or combinations comprising at least one of the foregoing in the composition.

The composition comprising the organic polymer and the SWNTs may be subject to multiple blending and forming steps if desirable. For example, the composition may first be extruded and formed into pellets. The pellets may then be fed into a molding machine where it may be formed into other desirable shapes such as housing for computers, automotive panels that can be electrostatically painted, or the like. Alternatively, the composition emanating from a single melt blender may be formed into sheets or strands and subjected to post-extrusion processes such as annealing, uniaxial or biaxial orientation.

In one embodiment involving the use of post-processing, the melt blended composition is further subjected to ultradrawing in the unaxial direction utilizing draw ratios of about 2 to about 1,000,000. The high ultradraw ratios generally facilitates the formation of shish-kebab semi-crystalline structures, which may contain SWNTs in the amorphous regions. In another embodiment, the composition is further stressed uniaxially or biaxially to produce a film having a thickness of about 0.01 micrometers to about 5000 micrometers. If the film comprises a semi-crystalline organic polymer, it is generally desirable for the oriented film to have crystals oriented in the azimuthal direction of about $\theta=0$ degrees to about $\theta=80$ degrees. In yet another embodiment related to post-processing after melt blending, the composition is supercooled to a temperature of about 1° C. to about 100° C. below the melting point after the blending for a time period of about 2 minutes to about 2 hours. The supercooled compositions may generally have macroscopic semi-crystalline structures such as spherulites, which comprise SWNTs.

In semi-crystalline polymers, the SWNTs may behave as nucleating agents. In order to improve the strength of the composition, it may be desirable to have the crystallites nucleate on the SWNTs. In general it is desirable to have at least 1 wt %, preferably at least 10 wt %, and more preferably at least 15 wt % of the crystallites nucleate on the SWNTs. In an exemplary embodiment, with regard to the use of nucleating agents, it has been observed that the use of nucleating agents (both carbon nanotube nucleating agents and other nucleating agents) can act to improve the electrical performance of compositions containing carbon nanotubes. By altering the way the crystal structures set up, a more conductive network can be set up. The conductive network can then setup a more continuous structure, which will exhibit lower electrical resistance than a similar composition without the nucleating agents.

Solution blending may also be used to manufacture the composition. The solution blending may also use additional energy such as shear, compression, ultrasonic vibration, or the like, to promote homogenization of the SWNTs with the organic polymer. In one embodiment, a organic polymer suspended in a fluid may be introduced into an ultrasonic sonicator along with the SWNTs. The mixture may be solution blended by sonication for a time period effective to disperse the SWNTs onto the organic polymer particles. The organic polymer along with the SWNTs may then be dried, extruded and molded if desired. It is generally desirable for the fluid to swell the organic polymer during the process of sonication. Swelling the organic polymer generally improves the ability of the SWNTs to impregnate the organic polymer during the solution blending process and consequently improves dispersion.

In another embodiment related to solution blending, the SWNTs are sonicated at ultrasonic frequencies together with organic polymer precursors. Organic polymer precursors can be monomers, dimers, trimers, or the like, which can be reacted to form organic polymers. A fluid such as a solvent may optionally be introduced into the sonicator with the SWNTs and the organic polymer precursor. The time period for the sonication is generally an amount effective to promote encapsulation of the SWNTs by the organic polymer precursor. After the encapsulation, the organic polymer precursor is then polymerized to form a organic polymer within which is dispersed the SWNTs. This method of dispersion of the SWNTs into organic polymer promotes the preservation of the aspect ratios of the SWNTs, which therefore permits the composition to develop electrical conductivity at lower loading of the SWNTs. Alternatively, the polymerized resin containing encapsulated SWNTs may be used as a masterbatch, i.e., blended with further organic polymer. In still another embodiment, a mixture of organic polymer, organic polymer precursor, optional fluid and SWNT composition is sonicated to encapsulate the SWNTs, followed by polymerization of the organic polymer precursor.

In one embodiment, the SWNTs together with other desired nanosized conductive fillers may be blended with a fluid such as a solvent and sonicated. Following sonication, the SWNTs together with the other nanosized conductive fillers may be dried and melt or solution blended to form the conductive composition. In another embodiment, the SWNTs together with other desired nanosized conductive fillers may be blended with a fluid such as a solvent and sonicated. Following sonication, the SWNTs together with the other nanosized conductive fillers may be melt or solution blended to form the conductive composition. The process of sonicating the SWNTs together with the nanosized conductive fillers permits an increased probability of interactions between the SWNT and the other nanosized conductive fillers. This leads to a reduction in the weight fractions of electrically conductive fillers (SWNTs and nanosized conductive fillers) that may be utilized for obtaining a conductive composition.

Suitable examples of organic polymer precursors that may be used to facilitate this method of encapsulation and dispersion are those used in the synthesis of thermoplastic resins such as, but not limited to polyacetals, polyacrylics, polycarbonates, polystyrenes, polyesters, polyamides, polyamideimides, polyarylates, polyurethanes, polyarylsulfones, polyethersulfones, polyarylene sulfides, polyvinyl chlorides, polysulfones, polyetherimides, polytetrafluoroethylenes, polyetherketones, polyether etherketones, or the like. In general, it is desirable to sonicate the above-described mixtures for about 1 minute to about 24 hours. Within this range, it is desirable to sonicate the mixture for a period of greater than or equal to about 5 minutes, preferably greater than or equal to about 10 minutes and more preferably greater than or equal to about 15 minutes. Also desirable within this range is a time period of less than or equal to about 15 hours, preferably less than or equal to about 10 hours, and more preferably less than or equal to about 5 hours.

In one embodiment, the SWNT compositions having a higher fraction of impurities may be dispersed using less energy than SWNT compositions having a lower fraction of impurities. Without being limited by theory, it is believed that in certain organic polymers, the impurities interact to promote a reduction in the Van der Waal's forces thereby facilitating an easier dispersion of the nanotubes within the organic polymer.

In another embodiment, the SWNT compositions having a higher fraction of impurities may require a larger amount of mixing than those compositions having a lower fraction of impurities. However, the composition having the SWNTs with the lower fraction of impurities generally lose electrical conductivity upon additional mixing, while the composition having the higher fraction of SWNT impurities generally gain in electrical conductivity as the amount of mixing is increased. These compositions may be used in applications where there is a need for a superior balance of flow, impact, and conductivity. They may also be used in applications where conductive materials are used and wherein the conductive materials possess very small levels of conductive filler such as in fuel cells, electrostatic painting applications, and the like.

The compositions described above may be used in a wide variety of commercial applications. They may be advantageously utilized as films for packaging electronic components such as computers, electronic goods, semi-conductor components, circuit boards, or the like which need to be protected from electrostatic dissipation. They may also be used internally inside computers and other electronic goods to provide electromagnetic shielding to personnel and other electronics located outside the computer as well as to protect internal computer components from other external electromagnetic interference. They may also be used advantageously in automotive body panels both for interior and exterior components of automobiles that can be electrostatically painted if desired.

The following examples, which are meant to be exemplary, not limiting, illustrate compositions and methods of manufacturing of some of the various embodiments of the electrically conductive compositions described herein.

EXAMPLES

Example 1

In this example, SWNTs (about 10 mg) containing 10 wt % impurity were sonicated in isopropanol (100 ml) for 20 minutes using an ultrasonication horn at 80% amplitude (using a 600 Watts ultrasonicator with probe diameter of 13 mm available from Sonics & Materials Incorporated, USA). The appropriate amount of Ketjen black powder (carbon black commercially available from Akzo) was then added to the dispersion and the mixture was further sonicated for 2 min. at only 30% amplitude to form a conductive mixture. The carbon black had a particle size of about 30 to about 50 nm. The carbon black and the SWNT dispersion was then dried at room temperature. A measured amount of the conductive mixture was added to a 5 wt % polycarbonate solution (50 ml) in 1,2 dichloroethane and sonicated lightly at 30% amplitude for 2 minutes. The polycarbonate used was PC 175, commercially available from the General Electric Company.

The mixture containing the polycarbonate, the carbon black and the SWNTs was then dried at room temperature and annealed at 190° C. for a period of 4 hours. The polycarbonate composite containing the carbon black and the SWNTs were then extruded on a small scale melt extruder at 280° C. (laboratory mixing and molding system manufactured by the Atlas Materials Testing Solutions, USA).

The strands were fractured under liquid nitrogen and the fractured ends were coated with conductive silver paint. The resistivity of the samples was then measured using a voltmeter and is shown in Table 1.

TABLE 1

| Sample No. | Carbon black (wt %) | SWNT (wt %) | Resistivity (kohm-cm) (standard deviation)* |
|---|---|---|---|
| 1 | 1 | 0 | — |
| 2 | 0.95 | 0.05 | — |
| 3 | 0.9 | 0.1 | 67 |
| 4 | 2.0 | 0 | 4.5 |
| 5 | 1.95 | 0.05 | 1.9 |
| 6 | 1.425 | 0.075 | 43 (33) |
| 7 | 0.95 | 0.05 | — |
| 8 | 0.90 | 0.1 | 67 (34) |
| 9 | 0.45 | 0.05 | 142 (17) |
| 10 | 0.27 | 0.03 | — |
| 11 | 0.15 | 0.15 | 2102 (690) |
| 12 | 0.25 | 0.25 | 25 (20) |
| 13 | 0.06 | 0.24 | 40 (48) |
| 14 | 0.06 | 0.24 | 59 (60) |
| 15 | 0 | 0.1 | — |
| 16 | 0 | 0.2 | 730 (340) |
| 17 | 0 | 0.3 | 387 (710) |
| 18 | 0 | 0.5 | 15 (16) |
| 19 | 1.0 | 0 | — |
| 20 | 1.5 | 0 | — |
| 21 | 2.0 | 0 | — |

*The numbers in parenthesis indicate standard deviations.

From Table 1 it may be seen that the sample containing a combination of carbon black and the carbon nanotubes generally have a lower resistivity than those samples having the same weight fraction of only carbon black. This indicates that there is a synergistic relationship between the nanosized conductive fillers and the SWNTs. From the Table 1, it may also be seen that as the weight percent of SWNTs in the conductive composition increase, the resistivity is reduced, despite lower overall filler loading (SWNTs and carbon black) in the conductive composition. This synergy is demonstrated in the FIG. 1, where the Ketjen black is plotted versus the SWNT loading. FIG. 1 demonstrates a drop in conductivity with the increase in SWNT content while simultaneously decreasing carbon black content.

Example 2

This example was undertaken to demonstrate the synergy between the SWNT and the nanosized conductive fillers, over other conductive combinations such as MWNTs and carbon black. In this example, a conducting filler composition containing 10 wt % SWNT and 90 wt % carbon black was melt blended with a polyphenylene ether-polyamide composition. The polyphenylene ether-polyamide composition is shown in Table 2.

A standard polyphenylene ether-polyamide conductive composition (Sample 23) was used as a control. The polyphenylene ether-polyamide composition was manufactured as detailed in Table 2. From the table it may be seen that the polyphenylene ether along with the citric acid, cupric iodide, potassium iodide, impact modifiers (Kraton G 1651 and G 1701x) were added to the extruder via the main feeder. The polyamides were added via side feeders attached to barrels 1-4, while the conductive combination was also added via side feeders attached to barrels 2-7. A comparative composition (Sample 26) containing 0.6 wt % multiwall carbon nanotubes (MWNT) and 1.4 wt % carbon black (Ketjen black commercially available form Akzo) was manufactured and tested in a manner similar to all the other samples in this example. The conductivity measurements were made in a manner similar to that in Example 1.

TABLE 2

| | Main feeder - 1st Barrel | | | | | | | Side feeder 1-4th Barrel | | Side feeder 2-7th Barrel |
|---|---|---|---|---|---|---|---|---|---|---|
| Sample # | Polyphenylene ether | Citric Acid | Cupric Iodide | Irganox 1076 | Potassium Iodide | Kraton G 1651 | Kraton G 1701X | Nylon 6 | Nylon 6, 6 | (wt %) Ketjen black + wt % (SWNT) |
| 22 | 34.1 | 0.7 | 0.01 | 0.3 | 0.1 | 7 | 8 | 39.425 | 10.375 | — |
| 23 | 34.1 | 0.7 | 0.01 | 0.3 | 0.1 | 7 | 8 | 38 | 10 | 1.8 wt % Ketjen Black |

TABLE 2-continued

| | Main feeder - 1st Barrel | | | | | | | Side feeder 1-4th Barrel | | Side feeder 2-7th Barrel |
|---|---|---|---|---|---|---|---|---|---|---|
| Sample # | Polyphenylene ether | Citric Acid | Cupric Iodide | Irganox 1076 | Potassium Iodide | Kraton G 1651 | Kraton G 1701X | Nylon 6 | Nylon 6, 6 | (wt %) Ketjen black + wt % (SWNT) |
| 24 | 34.1 | 0.7 | 0.01 | 0.3 | 0.1 | 7 | 8 | 38.475 | 10.125 | 1.08 wt % Ketjen Black + 0.12 wt % SWNT |
| 25 | 34.1 | 0.7 | 0.01 | 0.3 | 0.1 | 7 | 8 | 38.32 | 10.08 | 1.26 wt % Ketjen Black + 0.14 wt % SWNT |
| 26 | 34.1 | 0.7 | 0.01 | 0.3 | 0.1 | 7 | 8 | 37.84 | 9.96 | 1.4 wt % Ketjen Black + 0.6 wt % MWNT |

The extruder used for the extrusion was a standard 3 lobe screw-barrel extruder having 10 barrels with temperatures shown in the Table 3 below. The screw speed was set at 600 rpm.

TABLE 3

| Barrel # | Temperature (° C.) |
|---|---|
| 1 | 170 |
| 2 | 260 |
| 3 | 300 |
| 4 | 290 |
| 5 | 300 |
| 6 | 300 |
| 7 | 300 |
| 8 | 300 |
| 9 | 300 |
| 10 | 300 |
| Die | 310 |

The results for electrical resistivity are shown in Table 4.

TABLE 4

| Sample # | Conducting Filler Type (Wt %) | Volume Resistivity (kohm-cm) | Impact strength (kilojoules/m²) |
|---|---|---|---|
| 22 | No conducting filler | — | ~50 |
| 23 | Carbon black (1.8 wt %) | 4 | ~18 |
| 24 | 0.12 wt % SWNT + 1.08 wt % carbon black (1.2 wt %) | 1820 | 43 |
| 25 | 0.14 wt % SWNT + 1.26 wt % carbon black (1.4 wt %) | 0.54 | 22 |
| 26 | 0.6 wt % MWNT + 1.4 wt % carbon black (2 wt %) | 1.6 | 18 |

From the Table 4, it may be seen that a composition containing a SWNT and a nanosized conductive filler such as carbon black displays a synergy that permits the conductivity of the composition to be significantly increased over a composition containing only carbon black or MWNTs or a combination of the carbon black and the SWNTs.

Figure 2:
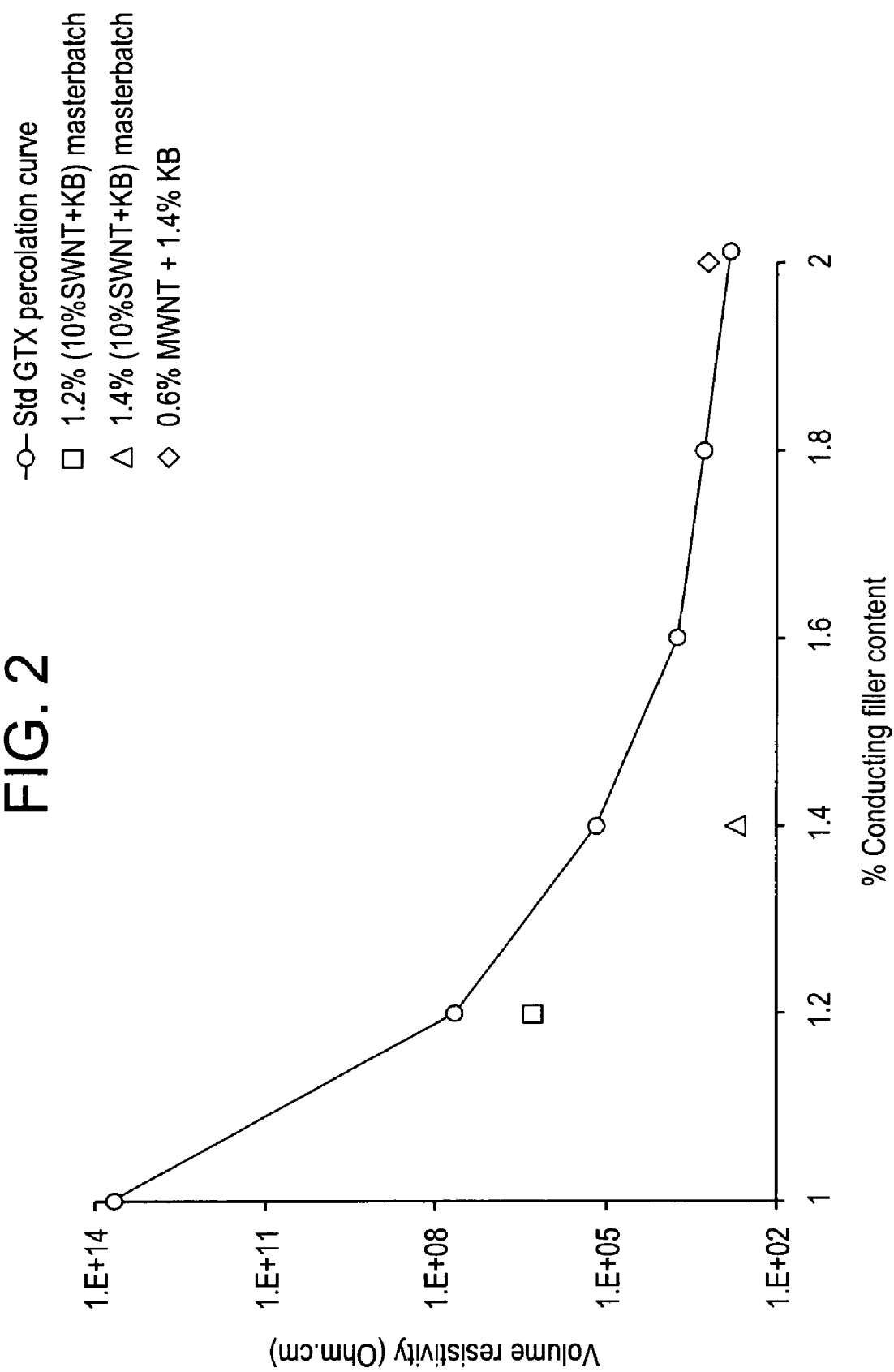
FIG. 2 is a graphical representation of the specific volume resistivity of the samples of Table 4 with a control composition.

As stated above, the electrical conductivity of the compositions of Table 4 were compared with a standard conductive polyphenylene ether-polyamide composition in the FIG. 2. From the figure it may be seen that the electrical conductivity of the compositions manufactured using the masterbatch approach (e.g., samples 24 and 25) show an electrical resistivity that is at least two orders of magnitude less than a standard conductive composition containing MWNTs.

Example 3

In this example the SWNTs were combined with MWNTs to produce a conductive composition. The organic polymer was polycarbonate. A discussion on the preparation of the various samples is listed below. The properties of the various compositions are shown in Table 5.

Samples 1-6

Extruder temperature was 285° C. The screw speed (rpm) was 150. Mixing time in the extruder was 3 minutes. The samples were prepared by dry blending a polycarbonate masterbatch containing 15 wt % MWNT, commercially available from Hyperion Catalysis with pure polycarbonate to achieve the concentrations of MWNT in the polycarbonate shown in Table 5. The blend mixture is added to the DACA mini-twin screw extruder (TSE) until a torque level of 5 Newton-meters (Nm) is obtained. This generally takes about 15 to about 30 seconds to completely load the DACA extruder. The mixture is then blended for 3 minutes and a strand is formed. Conductivity is not measurable below 2 wt % MWNT in the polycarbonate.

Samples 7-9

Extruder temperature was 285° C. The screw speed (rpm) was 150. Mixing time in the extruder was 3 minutes. The samples were prepared by dry blending SWNT from Carbon Nanotechnologies Inc (CNI) with polycarbonate to achieve the appropriate concentrations. SWNT/polycarbonate composites greatly outperform MWNT/polycarbonate composites. A composition containing 1 wt % MWNT is not conducting, while a dry blended extruded composition containing 1 wt % SWNT in polycarbonate has a specific volume resistivity of 7500 ohm-cm.

Samples 10-15

These samples were manufactured differently from the Samples 1-6 and Samples 7-9. The SWNTs for each sample were dispersed into chloroform with the use of a high powered ultrasonic processor. The ultrasonication was undertaken to achieve a suitable dispersion of the SWNT, or to separate the bundles of SWNT that are strongly held together by Van der Waals forces. The SWNT were dispersed in chloroform for 30 minutes using 400 Watts of power at an amplitude of 50% and a frequency of 20 kilohertz (kHz). The appropriate amount of polycarbonate was then added to arrive at the concentration of SWNT in polycarbonate listed in Table 5. This mixture was then sonicated for an additional 30 minutes. The chloroform was then evaporated and the mixture was vacuumed dried, and then ground into a fine powder, before extruding on the DACA mini-TSE. The powder was added to the DACA mini-TSE until a torque level of 5 Nm is obtained. This generally takes about 15 to about 30 seconds to completely load the DACA extruder. The mixture is then blended for 3 minutes and a strand was formed. The electrical resistivity was measured as detailed in Example 1. As shown in Table 5 the lowest volume resistivity (highest conductivity) is achieved using this method of dispersing the SWNT. Conductivity is measurable at a SWNT loading in polycarbonate of 0.1 wt %. At a SWNT loading of 1 wt % the electrical volume resistivity was measured to be 9.39 ohm-cm. A similar composition containing 1 wt % SWNT which was only dry blended prior to extrusion showed an electrical volume resistivity of 7500 ohm-cm as detailed above. A measurable volume resistivity was not measured using MWNT in the polycarbonate.

Samples 16-20

These 5 samples were prepared by dry blending the SWNT from CNI with the MWNT masterbatch from Hyperion to arrive at the appropriate concentrations of SWNT and MWNT listed in Table 5. The samples were then extruded in a manner similar to that detailed above for Samples 1-6. As the data shows adding small amounts of SWNT (0.2 or 0.5 wt %) to MWNT/polycarbonate composites reduces the specific volume resistivity (or enhances the conductivity). The notable point here is that blends of SWNT at 0.5 wt. % and 0.2 wt. %, when prepared via dry blending are not conductive. The blends of MWNT/polycarbonate are not as conductive when the SWNT are not added. A 3 wt % MWNT/polycarbonate blend has a volume resistivity of 96 Ohm-cm. Adding 0.5 wt % SWNT reduces the volume resistivity to 43 ohm-cm, or roughly half.

Samples 21-29

The SWNT were dispersed into chloroform with the use of a high powered ultrasonic processor. This was done is to achieve a well dispersed dispersion of SWNT, or to separate the bundles of SWNT that are strongly held together by Van der Waals forces. The SWNT are dispersed in chloroform for 30 minutes using 400 W of power at an amplitude of 50% and a frequency of 20 kHz. The appropriate amount of polycarbonate is then added to arrive at the concentration of SWNT in polycarbonate listed in Table 5. This mixture is then sonicated for an additional 30 minutes. The chloroform is then evaporated and the mixture is vacuumed dried, and then ground into a fine powder, before extruding on the DACA mini-TSE. This powder is then combined with the MWNT/polycarbonate masterbatch to arrive at the appropriate concentrations of SWNT and MWNT in polycarbonate. Sample 21 shows a very interesting finding. A 1 wt % MWNT/polycarbonate blend does not result in a conductive sample (e.g., Sample 1), however, when well dispersed SWNT are added at 0.2 wt. %, the volume resistivity drops to 709 ohm-cm (lower volume resistivity equals better conductivity). A blend of 0.2 wt. % SWNT/polycarbonate with no MWNT gives only a specific volume resistivity of 1512 ohm-cm (Sample 11). Therefore when well dispersed SWNT are added in small amounts to MWNT/polycarbonate blend, a substantial improvement in electrical conductivity takes place.

TABLE 5

| Sample # | SWNT (wt %) | MWNT (wt %) | Specific Volume Resistivty (ohm-cm) | |
|---|---|---|---|---|
| 1 | | 1 | — | |
| 2 | | 2 | 907 | |
| 3 | | 3 | 96 | Dry Blending; extrusion on DACA |
| 4 | | 5 | 34 | |
| 5 | | 10 | 4.34 | |
| 6 | | 15 | 2.5 | |

TABLE 5-continued

| Sample # | SWNT (wt %) | MWNT (wt %) | Specific Volume Resistivty (ohm-cm) | |
|---|---|---|---|---|
| 7 | 1 | | 7500 | Dry Blending; extrusion on DACA |
| 8 | 2.5 | | 380 | |
| 9 | 5 | | 50 | |
| 10 | 0.1 | | 1521095 | |
| 11 | 0.2 | | 1512 | |
| 12 | 0.5 | | 55 | Solution Blending; extrusion on DACA |
| 13 | 1 | | 9.39 | |
| 14 | 2 | | 3.08 | |
| 15 | 5 | | 1.56 | |
| 16 | 0.5 | 3 | 43 | |
| 17 | 0.2 | 5 | 14 | SWNT + Dry Blend MWNT − Dry Blend; extrusion on DACA |
| 18 | 0.5 | 5 | 15 | |
| 19 | 0.5 | 10 | 5.5 | |
| 20 | 0.5 | 15 | 2.5 | |
| 21 | 0.2 | 1 | 709 | |
| 22 | 0.5 | 1 | 90 | |
| 23 | 0.2 | 2 | 148 | SWNT + solution Process MWNT − Dry blend; extrusion on DACA |
| 24 | 0.5 | 2 | 60 | |
| 25 | 0.2 | 5 | 21 | |
| 26 | 0.5 | 5 | 11 | |
| 27 | 1.0 | 5 | 7 | |
| 28 | 0.5 | 10 | 4.7 | |
| 29 | 1.0 | 10 | 4.9 | |

Thus from the aforementioned examples it may clearly be seen that a combination of the SWNT with the nanosized conductive fillers lead to synergies which produce conductive compositions that have improved electrical properties. In particular these electrical properties are superior to conductive compositions having the same weight fraction of any one single type of conductive filler.

The conductive compositions comprising an organic polymer, SWNTs and the nanosized conductive fillers generally have an improved electrical conductivity of at least 10%, preferably at least 15%, and more preferably at least 20% over a conductive composition comprising a similar organic polymer and any one type of conductive filler. These compositions may be advantageously used in automobile exterior body panels packaging, and the like.

Example 4

This example was undertaken to demonstrate that SWNTs and nanosized organic/organometallic filler behave in a synergistic fashion to improve electrical conductivity in a conductive composition. The SWNTs containing impurities in an amount of 10 wt % were sonicated in a solvent containing the additive. Two types of solvent were used for the sonication, dichloroethane and chloroform. The polycarbonate powder was then added to the sonicator and the polycarbonate—SWNT mixture was sonicated for 40 minutes. The mixture was dried overnight and then dried at 200° C. in order to remove all traces of the solvent. The polycarbonate—SWNT mixture was then extruded into strands and electrical resistivity measurements were made as detailed in Example 1. The details are shown in Table 6.

TABLE 6

| Sample # | Nanosized organic/ organometallic filler | Volume Resistivity (kohm-cm) | |
| --- | --- | --- | --- |
| | | Chloroform | Dichloroethane |
| 1** | — | 732 (924) | 386 (714)* |
| 2 | Phthalo Blue | Not done | 11 (7) |

*numbers in parenthesis indicate standard deviations
**control sample

The control sample (sample 1) as well as the other sample (sample 2) contained 0.3 wt % of SWNT. From the Table 6 it may be seen that the sample 2 having nanosized organic/organometallic fillers displays superior electrical conductivity (lower resistivity) than those samples which do not contain the nanosized conducting organic/organometallic fillers.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. An electrically conductive precursor composition comprising:
   an organic polymer precursor;
   a single wall nanotube composition, wherein the single wall nanotube composition contains at least 0.1 wt % of production related impurities; and
   nanosized conductive filler.

2. The composition of claim 1, wherein the organic polymer precursor may be polymerized into a thermoplastic polymer.

3. The composition of claim 1, wherein the organic polymer precursor is polymerized into a polyacetal, polyacrylic, polycarbonate, polystyrene, polyester, polyamide, polyaniideimide, polyarylate, polyarylsulfone, polyethersulfone, polyphenylene sulfide, polyvinyl chloride, polysulfone, polyimide, polyetherimide, polytetrafluoroethylene, polyetherketone, polyether etherketone, polyether ketone ketone, polybenzoxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polypyrrolidine, polycarborane, polyoxabicyclononane, polydibenzofuran, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, or a combination comprising at least one of the foregoing organic polymers.

4. The composition of claim 1, wherein the organic polymer precursor is a monomer, dimer, trimer, or an oligomeric reactive species having up to about 40 repeat units.

5. The composition of claim 2, wherein the thermoplastic polymer has a molecular weight of greater than or equal to about 3,000 grams per mole.

6. The composition of claim 1, wherein the single wall carbon nanotube composition comprises single wall carbon nanotubes having a diameter of about 0.7 to about 2.4 nanometers.

7. The composition of claim 6, wherein the single wall carbon nanotubes have an aspect ratio of greater than or equal to about 5.

8. The composition of claim 1, wherein the organic polymer precursor composition further comprises a solvent.

9. The composition of claim 6, wherein the single wall carbon nanotubes exist in the form of ropes of at least about 10 carbon nanotubes.

10. The composition of claim 6, wherein the single wall carbon nanotubes exist in the form of ropes of at least about 100 carbon nanotubes.

11. The composition of claim 6, wherein the single wall carbon nanotubes exist in the form of ropes of at least about 1000 carbon nanotubes.

12. The composition of claim 1, wherein the single wall carbon nanotube composition comprises up to about 10 wt % impurities, wherein the impurities are iron, iron oxides, yttrium, cadmium, nickel, cobalt, copper, soot, amorphous carbon, multi-wall carbon nanotubes, or a combination comprising at least one of the foregoing impurities.

13. The composition of claim 1, wherein the single wall carbon nanotube composition comprises up to about 80 wt % impurities, wherein the impurities are iron, iron oxides, yttrium, cadmium, nickel, cobalt, copper, soot, amorphous carbon, multi-wall carbon nanotubes, or a combination comprising at least one of the foregoing impurities.

14. The composition of claim 6, wherein the single wall carbon nanotubes are metallic, semi-conducting, or a combination comprising at least one of the foregoing carbon nanotubes.

15. The composition of claim 14, wherein the single wall carbon nanotubes comprise about 1 to about 99.99 wt % metallic carbon nanotubes.

16. The composition of claim 14, wherein the single wall carbon nanotubes comprise about 1 to about 99.99 wt % semi-conducting carbon nanotubes.

17. The composition of claim 6, wherein the single wall carbon nanotubes are armchair nanotubes, zigzag nanotubes, or a combination comprising at least one of the foregoing nanotubes.

18. The composition of claim 14, wherein the single wall carbon nanotubes comprise about 1 to about 80 wt % impurities.

19. The composition of claim 1, wherein the nanosized conductive fillers have at least one dimension of less than or equal to about 100 nanometers.

20. The composition of claim 1, wherein the nanosized conductive fillers are carbon black, multiwall carbon nanotubes, vapor grown carbon fibers, conductive metal particles, conductive metal oxides, metal coated fillers, nanosized conducting organic/organometallic fillers, conductive polymers, or a combination comprising at least one of the foregoing fillers.

21. The composition of claim 20, wherein the metal coated fillers and the conductive metal particles comprise aluminum, copper, magnesium, chromium, tin, nickel, silver, iron, titanium, or a combination comprising at least one of the foregoing metals.

22. The composition of claim 20, wherein the metal coated fillers comprise silica powder, boron-nitride powder, boron-silicate powder, alumina, magnesium oxide, wollastonite, calcium sulfate, calcium carbonate, talc, mica, feldspar, silicate spheres, flue dust, cenospheres, fillite, aluminosilicate, sand, quartz, quartzite, perlite, tripoli, diatomaceous earth, synthetic silica, or a combination comprising at least one of the foregoing fillers.

23. An article manufactured from the composition of claim 1.

* * * * *